United States Patent
Resor et al.

(10) Patent No.: US 6,724,355 B2
(45) Date of Patent: Apr. 20, 2004

(54) ELECTRONICALLY ACTUATED DISPLAY ARRAY FOR DISPLAYING ARITHMETIC OPERATION SYMBOLS

(75) Inventors: Charles P. Resor, P.O. Box 667 2650 Yellowbell Cir., Wilson, WY (US) 83014; Tommy Jackson Martin, Lubbock, TX (US)

(73) Assignee: Charles P. Resor, Wilson, WY (US)

( * ) Notice: Subject to any disclaimer, the term of this patent is extended or adjusted under 35 U.S.C. 154(b) by 205 days.

(21) Appl. No.: 10/083,457

(22) Filed: Feb. 26, 2002

(65) Prior Publication Data

US 2003/0162155 A1 Aug. 28, 2003

(51) Int. Cl.[7] ................................................ G09G 3/04
(52) U.S. Cl. .............................. 345/33; 345/34; 345/38; 434/201
(58) Field of Search .............................. 345/33, 34–54; 434/201

(56) References Cited

U.S. PATENT DOCUMENTS

| | | | |
|---|---|---|---|
| 3,971,012 A | * | 7/1976 | Morokawa et al. ........... 345/33 |
| 4,040,048 A | | 8/1977 | Lien |
| 4,340,374 A | | 7/1982 | Culley ........................ 434/201 |
| 4,458,243 A | * | 7/1984 | Sado et al. ................... 345/33 |
| 5,016,002 A | * | 5/1991 | Levanto ....................... 345/33 |
| 5,135,398 A | | 8/1992 | Thornton et al. ............ 434/201 |
| 5,137,457 A | | 8/1992 | Howard et al. .............. 434/201 |
| 5,371,511 A | * | 12/1994 | Atherton et al. .............. 345/38 |

FOREIGN PATENT DOCUMENTS

GB          2118349 A    * 10/1983

* cited by examiner

*Primary Examiner*—Amr Awad
(74) *Attorney, Agent, or Firm*—Gregory E. Upchurch; Husch & Eppenberger, LLC

(57) ABSTRACT

An improved multi-segment, electronically-actuated display array that displays (a) a multiplication symbol configured approximately like "×", and, centered in the same location, (b) one or more of an addition symbol, a subtraction symbol, and a division symbol configured approximately like "+", "−", and "÷", respectively. A novel central segment or central segment group of the array displays a central portion of the multiplication symbol and of the other displayable arithmetic operation symbols—essentially the entire intersection of (a) the multiplication symbol and (b) a horizontal bar constituting the entire subtraction symbol, the horizontal portion of the addition symbol, and/or the vertically-centered portion of the division symbol. A novel feature of the central segment or central segment group is that its maximum horizontal dimension significantly exceeds the height of the just-mentioned horizontal bar and the thickness of the arms of any displayable addition symbol.

58 Claims, 7 Drawing Sheets

ELECTRONICALLY ACTUATED DISPLAY ARRAY FOR DISPLAYING ARITHMETIC OPERATION SYMBOLS

CROSS-REFERENCE TO RELATED APPLICATIONS

Not Applicable.

FEDERALLY SPONSORED RESEARCH PROGRAM

Not Applicable.

BACKGROUND OF THE INVENTION

1. Field of the Invention

This invention relates to an electronically-actuated display array, specifically, to such an array that uses different combinations of differently-shaped segments to display arithmetic operation symbols.

2. Prior Art

Numerous liquid-crystal displays and other electronically-actuated displays display a multiplication symbol (×) and at least one other symbol signifying one of the arithmetic operations of addition (+), subtraction (−), and division (÷ or occasionally /). Many of these displays attempt to reduce cost and/or increase visual clarity by using an array of differently-shaped segments to display these symbols. The following patents and products are illustrative of this prior art.

RadioShack Corporation has marketed under the trademark "Talking Math Calculator" a handheld device for teaching arithmetic skills. This device electronically displays two-operand arithmetic problems involving a selected one of the four basic arithmetic operations (e.g., 6 [divided by] 3). The device displays the symbols for these operations (+, −, ×, ÷), one symbol at a time, in separate, non-overlapping locations in its liquid crystal display (LCD). As a result, although these symbols are legible, they are not located in the same location or where the operator would normally expect to see them, and they are disproportionately smaller than the displayed numbers to which they relate. Consequently, they are not readily noticed or easily viewed. For instance, although the two operands of an addition problem are displayed in a horizontal format (i.e., with the second operand to the right of the first operand), the addition symbol (+) is not located between the two operands where the user would expect to see it, but rather substantially above the operands. Nor is the symbol displayed with dimensions that even approach being proportional to those of the displayed digits of the operands. As a result, the fact that an addition problem is being displayed is not readily apparent. The inadequacies of the LCD result in large part from its inability to display all four arithmetic symbols in the same appropriate location (i.e., between the two operands) and, therefore, from its need to use four separate locations, which in turn results in compromises in the sizing and location of the symbols.

Texas Instruments, Incorporated, has marketed, under the trademark "Math . . . To Go!", a handheld device that teaches basic arithmetic. This device can display two-operand arithmetic problems, including a representation of any one of the above-listed four basic arithmetic operator symbols. But its representation of a multiplication symbol consists solely of four diagonally-oriented lines pointing toward a vacant center and, therefore, does not closely simulate a normal multiplication symbol. This is especially undesirable in view of the fact that multiplication probably is practiced more than any of the other three basic arithmetic operations. Moreover, the device's addition symbol can be confused with its division symbol.

ExploraToy, under the trademark "math whiz", has also marketed a handheld device that teaches basic arithmetic. It too displays arithmetic problems, including a representation of any one of the four basic arithmetic operator symbols. And its representation of a multiplication symbol also consists solely of four diagonally-oriented lines pointing toward a vacant center and, therefore, does not closely simulate a normal multiplication symbol.

U.S. Pat. No. 4,040,048, issued Aug. 2, 1977 to Lien, discloses a light-emitting-diode display array that displays, one at a time, symbolic representations of the four basic arithmetic operations, using appropriate combinations of seven segments (horizontal, V-shaped, and vertical). The multiplication symbol, however, has a vacant center which detracts substantially from its clarity and esthetic appearance. Moreover, the vertical arms of the addition symbol have confusing gaps, two of which are caused by the fact that V-shaped segments are used for the multiplication symbol.

U.S. Pat. No. 4,340,374, issued Jul. 20, 1982 to Culley, illustrates in FIG. 2 in connection with disclosed electronic learning aids another similar array of component segments for displaying, one symbol at a time, representations of the addition symbol, the subtraction symbol, the multiplication symbol, and the division symbol. To represent the multiplication symbol, this array uses four straight diagonally-oriented segments instead of two V-shaped segments. Again, the effectiveness of the multiplication symbol suffers substantially from a vacant center.

U.S. Pat. No. 5,135,398, issued Aug. 4, 1992 to Thornton et al., and U.S. Pat. No. 5,137,457 issued Aug. 11, 1992 to Howard et al., illustrate in connection with disclosed electronic teaching devices an 11-segment array for displaying the four arithmetic operation symbols. The array uses a central square segment; two horizontal rectangular segments, one directly left and the other directly right of the central segment; four almost-square segments, two directly above and two directly below the central segment; and four diagonally-oriented segments arranged symmetrically around the central segment. Despite the importance of the multiplication symbol, the resulting representation of that symbol appears to have four triangular cavities around its center when compared to a normal multiplication symbol and, therefore, is significantly less effective than it would otherwise be.

Thus, all these prior-art devices either (1) display a multiplication symbol whose central portion is seriously flawed by a design that attempts to accommodate other arithmetic operation symbols in the same location; or (2) display (a) some of the four basic arithmetic operator symbols in locations where the operator does not expect to see them and (b) all the symbols in smaller than optimal proportions. In the first instance, especially in the case of young users, the often very important multiplication symbol is confusing, not quickly recognizable and/or eventually fatiguing to the user. In the second instance, the disproportionately-small and inappropriately-located symbols tend to be less noticeable and to make the device more time-consuming. In both instances, the device in question is less convenient and pleasing to use and, therefore, less likely to be used. Moreover, in attempting to commit to memory a basic arithmetic equation (math fact), such as 7×8=56, a student will sometimes find it helpful to form a mental visual image of the math fact. However, if a device presents the problem (7×8) and the math fact (7×8=56) with a visually distorted or disproportionately-small and inappropriately-located arithmetic operator (here, the multiplication symbol), the device does not effectively reinforce the student's mental image of the math fact.

BRIEF SUMMARY OF THE INVENTION

In view of the above, several objects of the invention are as follows: To provide an improved arithmetic display array; To provide an electronically actuated visual display array that can economically display, one at time, the symbols of all four of the basic arithmetic operations and that substantially eliminates all of the above-described disadvantages associated with prior-art devices; To provide alternative types of an electronically actuated visual display array that, even within the physically-limited confines of an inexpensive portable device, can clearly and relatively fully display, one symbol at a time and in the same appropriate location, essentially true representations of (a) a multiplication symbol approximating "×" and (b) one or more other of the following: an addition symbol approximating "+", a subtraction symbol approximating "−", and a division symbol approximating "÷."

A further object is to provide display arrays which are like all those described above and which have the additional capability of displaying all segments used in the different arithmetic operation symbols simultaneously as a composite symbol.

Still further objects and advantages will become apparent from consideration of the ensuing description and drawings.

The present invention provides an economical, multi-segment, electronically-actuated display array for visually displaying one arithmetic operation symbol at a time. Specifically, it displays (a) a multiplication symbol configured approximately like "×" and (b) one or more of (1) an addition symbol configured approximately like "+", (2) a subtraction symbol configured approximately like "−", and (3) a division symbol configured approximately like "÷". A novel central segment or central group of two to five adjacent segments (central "segment group") of the display array displays a central portion of the multiplication symbol and of the other displayable arithmetic operation symbol or symbols. This central portion of the symbols includes, at least, essentially the entire intersection of (a) the multiplication symbol and (b) a horizontal bar constituting the entire subtraction symbol, the horizontal portion of the addition symbol, and/or the vertically-centered portion of the division symbol, depending upon which of these other symbols can also be displayed. A novel feature of the central segment or central segment group is that while it is used to display a central portion of each arithmetic operation symbol displayable by the display array, its maximum horizontal dimension significantly exceeds (a) the maximum vertical dimension of the just-referenced horizontal bar and (b) if the addition symbol is displayable by the display array, the maximum horizontal dimension of segments or segment groups used solely to display vertical portions of the addition symbol. This feature results in a more filled-out and true representation of the multiplication symbol without substantially compromising the representation of other arithmetic symbols. The preferred embodiment has a 13-segment, LCD array that can display all four arithmetic operation symbols individually or all their component segments as a composite symbol, and the array's novel central segment is hexagonal and has a V-shaped indentation pointing horizontally into each of its left and right extremities.

BRIEF DESCRIPTION OF THE DRAWINGS

In the drawings, closely related figures have the same number but different alphabetic suffixes.

REFERENCE NUMERALS

Figure 1A:
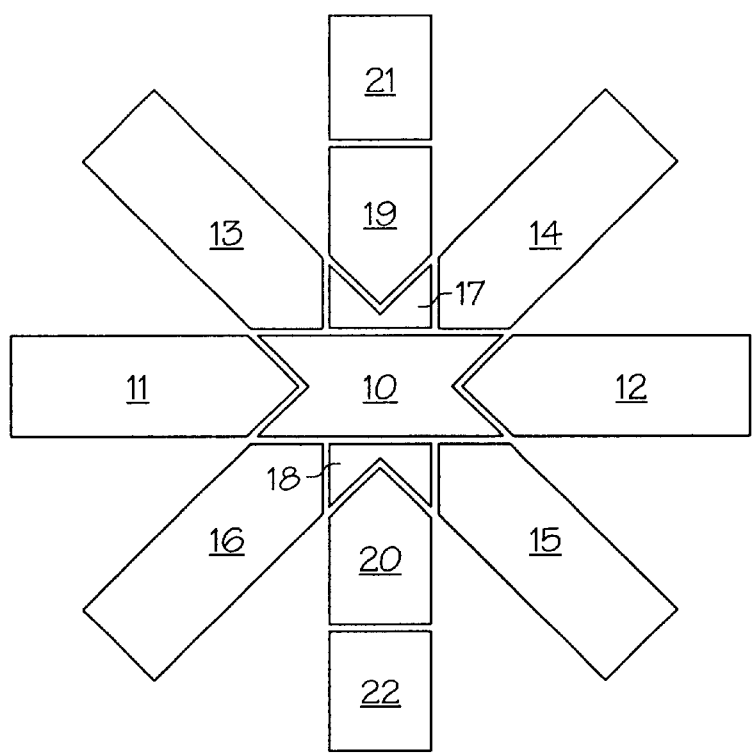
FIG. 1A shows a schematic graphic layout of an LCD array with a hexagonal central segment and twelve additional segments in accordance with the invention.

10 hexagonal central segment of 13-segment display array for an LCD
11 left-side horizontal segment of 13-segment display array
12 right-side horizontal segment of 13-segment display array
13 upper-left diagonally-oriented segment of 13-segment display array
14 upper-right diagonally-oriented segment of 13-segment display array
15 lower-right diagonally-oriented segment of 13-segment display array
16 lower-left diagonally-oriented segment of 13-segment display array
17 upper indented pentagonal segment of 13-segment display array 18 lower indented pentagonal segment of 13-segment display array
19 upper vertically oriented pointed pentagonal segment of 13-segment display array
20 lower vertically oriented pointed pentagonal segment of 13-segment display array
21 upper rectangular segment of 13-segment display array
22 lower rectangular segment of 13-segment display array
28 case of ELA for teaching arithmetic tables
29 LCD of ELA
30 LCD array of FIG. 1A
31 first "matrix-eight" numerical character of LCD of ELA
32 second matrix-eight character of LCD of ELA
33 third matrix-eight character of LCD of ELA
34 fourth matrix-eight character of LCD of ELA
35 fifth matrix-eight character of LCD of ELA
36 "=" symbol of LCD of ELA
38 case of arithmetic calculator for children
39 LCD of calculator
40 LCD array of FIG. 1A
41 first matrix-eight character of LCD of calculator
42 second matrix-eight character of LCD of calculator
43 third matrix-eight character of LCD of calculator
44 fourth matrix-eight character of LCD of calculator
45 fifth matrix-eight character of LCD of calculator
46 sixth matrix-eight character of LCD of calculator
47 seventh matrix-eight character of LCD of calculator
48 eighth matrix-eight character of LCD of calculator
49 ninth matrix-eight character of LCD of calculator
50 tenth matrix-eight character of LCD of calculator
51 "=" symbol of LCD of calculator
52 "R" symbol of LCD of calculator
60 16-sided central segment of nine-segment display array for an LCD
61 left-side horizontal segment of nine-segment display array
62 upper vertically oriented pentagonal segment of nine-segment display array
63 right-side horizontal segment of nine-segment display array
64 lower vertically oriented pentagonal segment of nine-segment display array
65 upper-left diagonally-oriented segment of nine-segment display array
66 upper-right diagonally-oriented segment of nine-segment display array
67 lower-right diagonally-oriented segment of nine-segment display array
68 lower-left diagonally-oriented segment of nine-segment display array
70 hexagonal central segment of 11-segment display array for an LCD
71 left-side horizontal segment of 11-segment display array
72 right-side horizontal segment of 11-segment display array
73 upper-left diagonally-oriented segment of 11-segment display array
74 upper-right diagonally-oriented segment of 11-segment display array
75 lower-right diagonally-oriented segment of 11-segment display array
76 lower-left diagonally-oriented segment of 11-segment display array
77 upper indented pentagonal segment of 11-segment display array
78 lower indented pentagonal segment of 11-segment display array
79 upper vertically oriented pointed pentagonal segment of 11-segment display array
80 lower vertically oriented pointed pentagonal segment of 11-segment display array
81 left-side horizontal segment of LCD array having 12-sided central segment
82 right-side horizontal segment of LCD array having 12-sided central segment
83 upper-left diagonally-oriented segment of array having 12-sided central segment
84 upper-right diagonally-oriented segment of array having 12-sided central segment
85 lower-right diagonally-oriented segment of array having 12-sided central segment
86 lower-left diagonally-oriented segment of array having 12-sided central segment
87 upper triangular segment of LCD array having 12-sided central segment
88 lower triangular segment of LCD array having 12-sided central segment
89 upper interior rectangular segment of LCD array having 12-sided central segment
90 lower interior rectangular segment of LCD array having 12-sided central segment
91 upper exterior rectangular segment of LCD array having 12-sided central segment
92 lower exterior rectangular segment of LCD array having 12-sided central segment
93 12-sided central segment of 13-segment display array for an LCD
100 hexagonal central segment of seven-segment display array for an LCD
101 left-side horizontal segment of seven-segment display array
102 right-side horizontal segment of seven-segment display array
103 upper V-like segment of seven-segment display array
104 lower V-like segment of seven-segment display array
105 upper circular segment of seven-segment display array
106 lower circular segment of seven-segment display array
107 middle segment of central segment group with three segments
108 left segment of central segment group with three segments
109 right segment of central segment group with three segments
110 hexagonal central segment of asymmetrical 11-segment display array for an LCD
111 left-side horizontal segment of asymmetrical 11-segment display array
112 right-side horizontal segment of asymmetrical 11-segment display array
113 upper-left diagonally-oriented segment of asymmetrical 11-segment display array
114 upper-right diagonally-oriented segment of asymmetrical 11-segment array
115 lower-right diagonally-oriented segment of asymmetrical 11-segment array
116 lower-left diagonally-oriented segment of asymmetrical 11-segment display array
117 upper indented pentagonal segment of asymmetrical 11-segment display array
118 lower indented pentagonal segment of asymmetrical 11-segment display array
119 upper vertically oriented pointed pentagonal segment of asymmetrical array
120 lower vertically oriented pointed pentagonal segment of asymmetrical array

DETAILED DESCRIPTION OF THE INVENTION

FIG. 1A shows a schematic top view of an LCD array with a hexagonal central segment 10 and twelve additional segments, in accordance with a preferred embodiment of the invention. The 13-segment array is used in an electronically actuated visual display device that displays, one symbol at a time, essentially true representations of an addition symbol, a subtraction symbol, a multiplication symbol, a division symbol, and a composite symbol consisting of all thirteen segments. All the symbols are centered at the same point—the geometric center of the hexagonal central segment. All segments that would otherwise be contiguous are separated by a narrow (i.e., approximately 0.15-mm wide) gap (sometimes referred to below as "the usual gap"). For simplicity of discussion, the symbols are sometimes dealt with below as if the gap did not exist. Segments 11 and 12 extend to the left and right of central segment 10, respectively. Similarly, segments 13, 14, 15, and 16 extend to the upper left, upper right, lower right, and lower left of segment 10, and segments 17 and 18 are centered above and adjacent (i.e., virtually or actually touching) and below and adjacent segment 10, respectively. Segments 19 and 20 extend upward from segment 17 and downward from segment 18, respectively. Finally, segment 21 is located adjacent and above segment 19, and segment 22 is located adjacent and below segment 20.

Figure 1B:
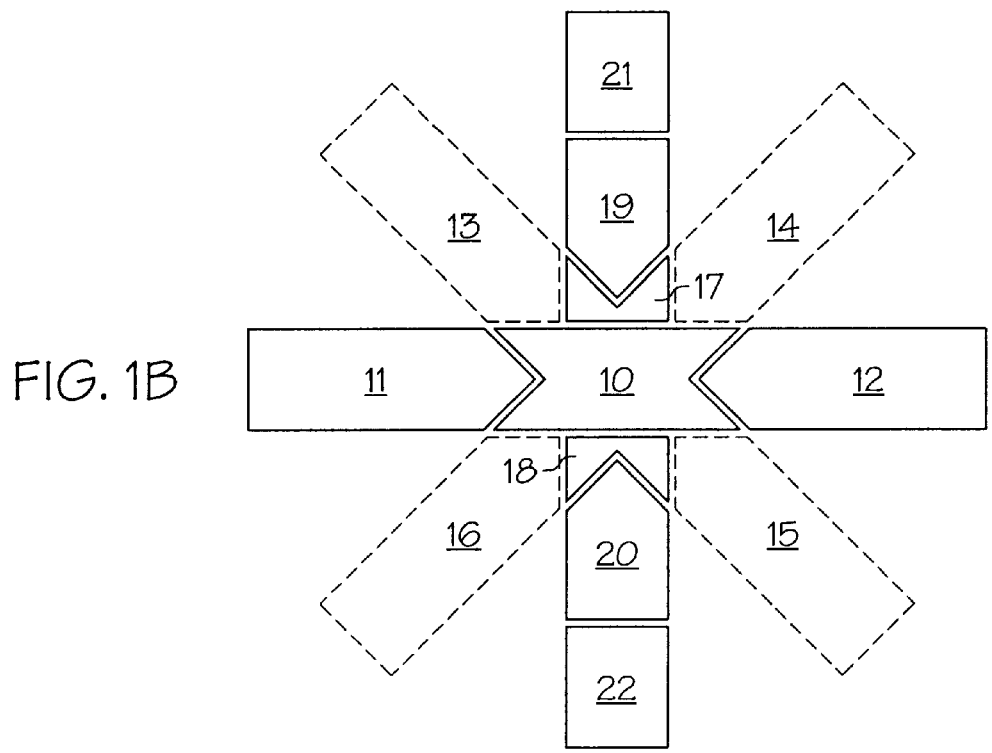
FIG. 1B shows the array of FIG. 1A actuated to represent an addition symbol with dark segments shown in full lines and segments which are not visible shown in broken lines.

As shown in the solid lines of FIG. 1B, the 13-segment array can display an addition symbol "+" configured like an upright, horizontally and vertically symmetrical, two-dimensional cross. When the addition symbol is to be displayed, segments are suitably energized in a known manner so that the full-line segments (10, 11, 12, 17, 18, 19, 20, 21, and 22) in FIG. 1B appear dark. The rest of the segments, represented by hidden (broken) lines in FIG. 1B, are made to appear transparent.

Figure 1C:
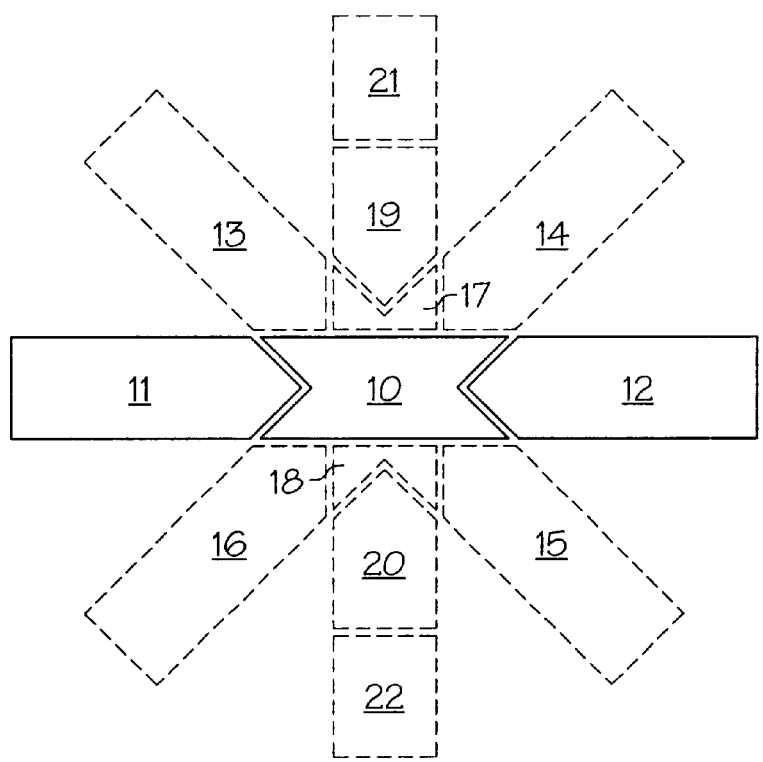
FIG. 1C shows the array of FIG. 1A actuated to represent a subtraction symbol with dark segments shown in full lines and segments which are not visible shown in broken lines.

When the subtraction symbol "−" is to be displayed, segments 10, 11, and 12 are energized. (FIG. 1C) As a result, the array displays an elongated, horizontally oriented rectangle, which is the same as the horizontal portion of the addition symbol.

Figure 1D:
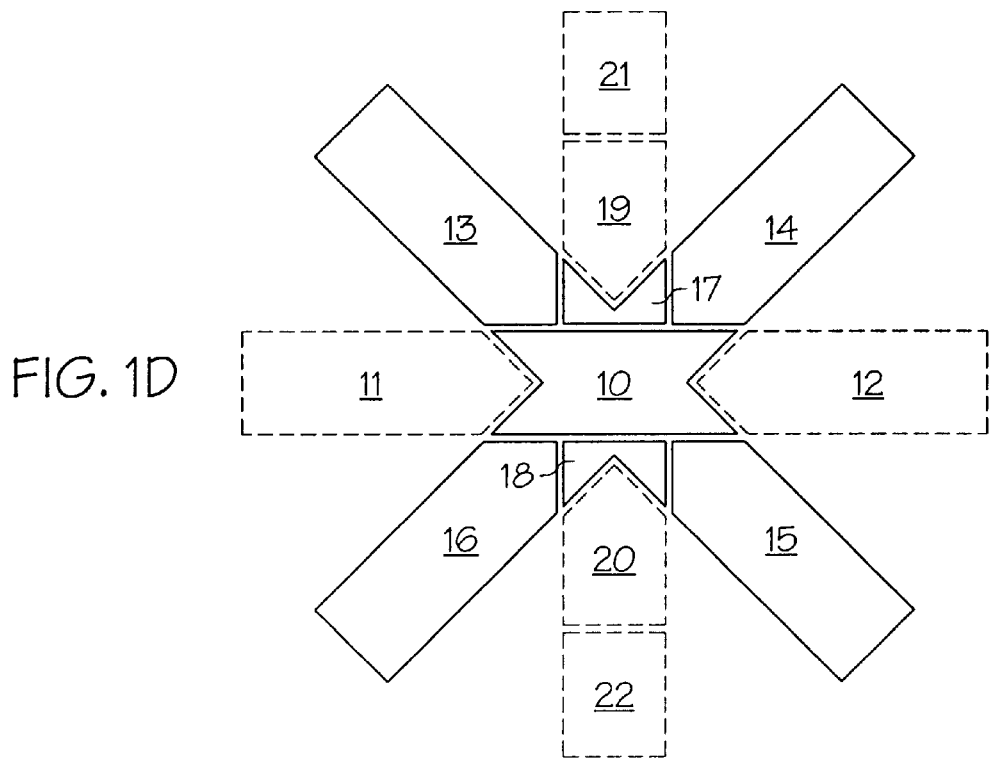
FIG. 1D shows the array of FIG. 1A actuated to represent a multiplication symbol with dark segments shown in full lines and segments which are not visible shown in broken lines.

When the multiplication symbol "×" is to be displayed, segments 10, 13, 14, 15, 16, 17, and 18 are made dark. (FIG. 1D) The "×" is configured like a horizontally and vertically symmetrical, two-dimensional cross with arms of equal length that has been rotated 45 degrees from an upright position.

When the division symbol "÷" is to be displayed, segments 10, 11, 12, 21, and 22 are made dark. (FIG. 1E) In this symbol, the subtraction symbol is combined with two approximately-square rectangles—one of the rectangles centered a certain distance above the subtraction symbol, one of them centered the same distance below it. Both of them are parallel to it.

Measured from its extremities which are the same as those of the addition symbol, the LCD array in this embodiment is about 10.3 mm-high and 10.6-mm wide. The horizontal and vertical arms of the addition symbol are rectangular and are about 1.8-mm wide. The subtraction symbol obviously has the same dimensions and shape as the horizontal portion of the addition symbol. The diagonally-oriented arms of the multiplication symbol are rectangular, are about 1.8-mm wide, and extend out equally about as far as possible without exceeding the 10.3-mm vertical dimension of the array. In this embodiment the upper left and lower right arms in this embodiment are perpendicular to the upper right and lower left ones. The division symbol's two approximately-square rectangles are both about 1.8 mm on each side and are each located about 2.45 mm from the nearest edge of the elongated horizontal rectangle that constitutes the center of the division symbol (as well as the entire subtraction symbol).

Details of Segments: The following is a more detailed physical description of the array's thirteen segments.

Hexagonal display segment 10 is in the center of the array. Segment 10 is coincident with the entire intersection of the multiplication and subtraction symbols. Thus, segment 10 is shaped symmetrically with respect to its vertical and horizontal axes. Its top and bottom are each a straight, approximately 4.3 mm in length, and spaced approximately 1.8 mm apart from each other. Thus, its width exceeds its height by approximately 140%. Its left end is made up of two straight lines of equal length forming an inwardly-pointed 90-degree angle that is symmetrical with respect to the horizontal axis. Similarly, the right end is made up of two straight lines of equal length forming an inwardly-pointed 90-degree angle that is symmetrical with respect to the horizontal axis. As a result, the basic shape of segment 10 resembles a horizontal bar with V-shaped indentations at its ends.

Extending out, yet spaced from central segment 10, is a series of radial segments as follows: Segment 11 is a horizontally extending, pentagonal segment which is located adjacent the left end of segment 10. The right end or right boundary of segment 11 is made up of two straight lines of equal length forming an outwardly-pointed 90-degree angle. This protruding right boundary is adjacent and parallels the indented left boundary of segment 10. Segment 11 is coincident with that portion of the subtraction symbol that extends to the left of segment 10 except for the usual gap between the tapered right end of segment 11 and the inwardly-pointed left end of segment 10.

Segment 12 is a horizontally extending, pentagonal segment which is located adjacent the right end of segment 10. Segment 12 is a symmetrical mirror image of segment 11.

Segment 17 is an indented, pentagonal segment which is located adjacent the center of the top of segment 10. Specifically, the base of segment 17 is a straight line that is parallel to, horizontally centered with respect to, and separated by the usual gap from the line forming the upper edge of segment 10. The left and right sides (or boundaries) of segment 17 are two straight upward-extending lines of equal length that are perpendicular to the base of segment 17. The top of segment 17 is made up of two straight lines of equal length forming an inwardly-pointed, 90-degree angle. These latter two lines are coincident with the lowest portions of the upper edges of the two upper arms of the multiplication symbol. Thus, segment 17 is coincident with the intersection of the upper arm of the addition symbol with the upper arms of the multiplication symbol except for the usual gap between the top of segment 10 and the base of segment 17.

Segment 18 is an indented, pentagonal segment which is located adjacent the center of the base of segment 10. Segment 18 is a symmetrical mirror image of segment 17.

Segment 21 is a rectangular segment which is coincident with the highest, approximately-square rectangular component of the three-component division symbol. Segment 21's four sides are each about 1.8 mm in length, and its horizontal bottom side is parallel to, horizontally centered with respect to, and about 2.45 mm above the upper edge of segment 10.

Segment 22 is a rectangular segment which is coincident with the lowest, approximately-square rectangular component of the three-component division symbol. Segment 22 is a symmetrical mirror image of segment 21.

Segment 19 is a downwardly-pointed, pentagonal segment which is located between segments 21 and 17. The top of segment 19 is positioned directly below the base of segment 21 and separated from it by the usual gap. The bottom of segment 19 is made up of two straight lines of equal length forming an outwardly-pointed, 90-degree angle. The usual gap separates the tapered bottom of segment 19 from the inwardly-pointed top of segment 17. The left and right sides of segment 19 are straight and perpendicular to its top and are in line with the left and right sides, respectively, of segments 21 and 17. Thus, segment 19 is coincident with that portion of the upper arm of the addition symbol that is below the bottom of segment 21 and above the top of segment 17 except for the usual gaps that separate segment 19 from segment 21 and segment 17.

Segment 20 is an upwardly-pointed, pentagonal segment which is located between segment 22 and segment 18. Segment 20 is a symmetrical mirror image of segment 19.

Segment 13 is a pentagonal segment which is coincident with the upper left arm of the multiplication symbol except where that arm overlaps segment 10 and segment 17 and except for the usual gaps separating segment 13 from segment 10 and segment 17. Thus, segment 13 is diagonally positioned with respect to the array and slants up to the left. It is squared off at its upper left end. Its lower right end is made up of two straight lines of equal length—one horizontal and one vertical—forming an outwardly-pointed, 90-degree angle. Segment 13 is symmetrical with respect to the imaginary straight line that bisects that angle and is separated—along the just-referenced horizontal and vertical lines—from segment 10 and segment 17 by the usual gaps.

Segment 14 is a pentagonal segment which is coincident with the upper right arm of the multiplication symbol except where that arm overlaps segment 10 and segment 17 and except for the usual gaps separating segment 14 from segment 10 and segment 17. Thus, segment 14 is diagonally positioned with respect to the array and slants up to the right. It is a symmetrical mirror image of segment 13, taken across a straight vertical imaginary line that bisects segment 10.

Segment 15 is a pentagonal segment which is coincident with the lower right arm of the multiplication symbol except where that arm overlaps segment 10 and segment 18 and except for the usual gaps separating segment 15 from segment 10 and segment 18. Thus, segment 15 is diagonally positioned with respect to the array and slants down to the right. It is a symmetrical mirror image of segment 14, taken across a straight horizontal imaginary line that bisects segment 10.

Segment 16 is a pentagonal segment which is coincident with the lower left arm of the multiplication symbol except where that arm overlaps segment 10 and segment 18 and except for the usual gaps separating segment 16 from segment 10 and segment 18. Thus, segment 16 is diagonally positioned with respect to the array and slants down to the left. It is a symmetrical mirror image of segment 13, taken across a straight horizontal imaginary line that bisects segment 10.

Segments 13, 14, 15, and 16 are congruent. That is, if superimposed and appropriately oriented, they would coincide with each other.

Each segment has a conventional conductive lead (not shown) which connects the segment to a unique pin (not shown) on the edge of the display panel, and all segments are electronically coupled to a single backplane electrode (not shown). All of the segments can be actuated individually by conventional "direct drive" LCD technology (not shown). In general, the embodiment is manufactured using standard technology well known to persons skilled in the art and used in the design and manufacture of LCD's for battery-powered, handheld calculators and games that have long been sold to the public.

Operation—Preferred Embodiment

The present embodiment is particularly useful, for example, in a handheld electronic learning aid (ELA) for teaching arithmetic skills or in a calculator for young children, especially, but not exclusively, in a device of this sort that uses relatively large representations of numbers and of the symbols for the four basic arithmetic operations.

Our novel display arrays for generating visual representations of basic arithmetic operation symbols in a calculator or in an arithmetic learning aid are used as in prior-art displays.

Figure 1E:
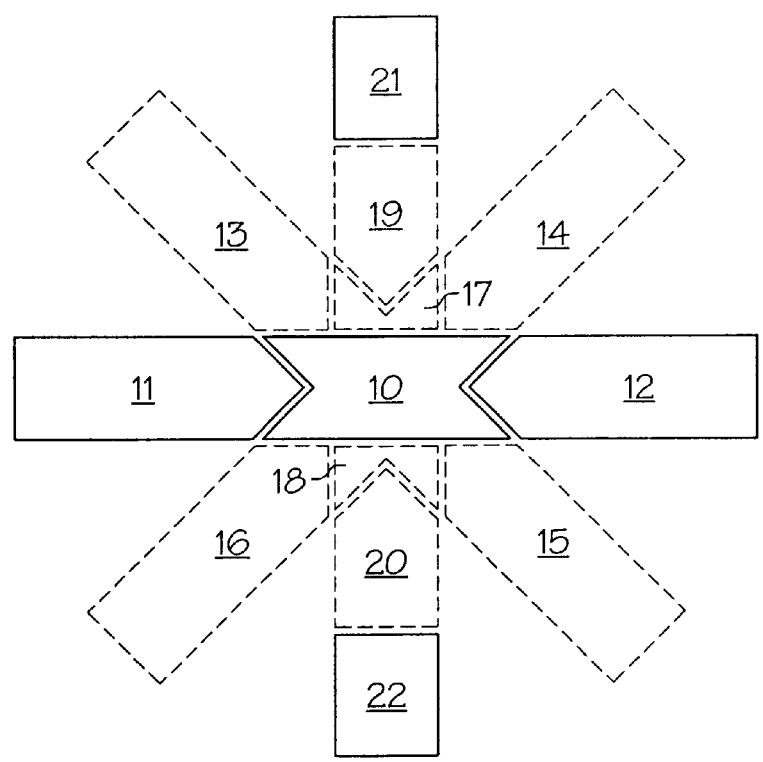
FIG. 1E shows the array of FIG. 1A actuated to represent a division symbol with dark segments shown in full lines and segments which are not visible shown in broken lines.

Hexagonal segment 10 displays the center of each of the four arithmetic operation symbols. Segments 10, 11, 12, 17, 18, 19, 20, 21, and 22 are actuated to display the addition symbol as shown in FIG. 1B. Segments 10, 11, and 12 are actuated to display the subtraction symbol. (FIG. 1C) Segments 10, 13, 14, 15, 16, 17, and 18 are actuated to display the multiplication symbol. (FIG. 1D) Segments 10, 11, 12, 21, and 22 are actuated to display the division symbol. (FIG. 1E)

All thirteen segments are actuated to display a composite symbol. (FIG. 1A) The composite symbol can function as a visual prompt that, when blinking, indicates to a user that the user needs to consider selecting one of the four arithmetic operations by pushing an appropriate key. Such a feature can be helpful in a calculator designed for children to remind them to select the arithmetic function that they intend to use. And in an ELA, a flashing composite symbol is helpful to remind a student to select an arithmetic function to solve a problem displayed by the ELA—for instance, to select multiplication to answer the problem displayed as "7*8=56" where "*" represents the composite symbol.

This embodiment overcomes all the disadvantages of the aforementioned prior-art devices. It displays an essentially filled-out and true representation of each of the four basic arithmetic symbols. Each representation is centered in the same location which is appropriate relative to the numbers to which it relates. And the size of each representation is in proportion to the numbers to which it relates. As a result, when displayed, each symbol is immediately and easily noticed, recognized, and understood in the context of the numbers and other displayed information to which it relates.

Figure 2:
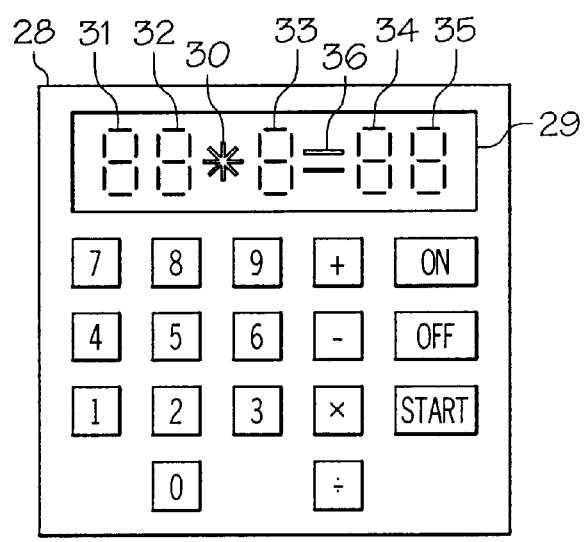
FIG. 2 shows a top schematic view of an electronic learning aid (ELA) that teaches arithmetic tables and that embodies the LCD array of FIG. 1A, in accordance with the invention.

FIG. 2 shows a top view of a battery-powered, integrated-chip-based ELA that uses the display array of FIG. 1 and that teaches arithmetic tables, more specifically, the one hundred basic addition equations from 0+0=0 through 9+9=18; the one hundred basic subtraction equations from 0−0=0 through 18−9=9; the one hundred basic multiplication equations from 0×0=0 through 9×9=81; and the ninety basic division equations from 0÷1=0 through 81÷9=9.

The ELA has a case 28 that, in one embodiment, is approximately ten cm wide, ten cm high, and two cm thick. Centered horizontally in the upper portion of the front of case 28 is an LCD 29 that is approximately 7.6 cm wide and two cm high. Spanning LCD 29 from left to right are a first matrix-eight numerical character 31 configured in the familiar seven-segment design; a second matrix-eight character 32; a 13-segment array 30 like that shown in FIG. 1A for visually representing either an addition symbol, a subtraction symbol, a multiplication symbol, a division symbol, or a combination of all thirteen segments as a composite symbol; a third matrix-eight character 33; an "=" symbol 36; a fourth matrix-eight character 34; and a fifth matrix-eight character 35. (13-segment array 30 is preferably somewhat larger than shown in FIG. 2.)

The following keys are located on the top of case 28 below LCD 29. Farthest to the right in a vertical column are, beginning at the top: an ON key for turning the ELA on; an OFF key for turning the ELA off; and a START key for starting the presentation of a set of 50 problems when the ELA is on. Immediately to the left of these three keys, arranged in a vertical column, are: a + key for designating the arithmetic operation of addition; a − key for designating subtraction; and a × key for designating multiplication. Below the × key is a ÷ key for designating division. Also on the top of case 28 arranged in the three-by-three pattern normally found on calculators are the "1", "2", "3", "4", "5", "6", "7", "8", and "9" keys for entering the nine designated digits. A "0" key for entering the digit 0 is located below the "2" key.

The operation of the ELA is as follows: The ELA shown in FIG. 2 is turned on by pushing the ON key. This results in the blinking display of a composite symbol (i.e., segments 10 through 22) by 13-segment LCD array 30 in LCD 29. If the START key is then pushed, a problem is displayed in LCD 29. Since the composite symbol was blinking when the START key was pushed, the problem is based on one of the three hundred ninety addition, subtraction, multiplication, and division equations taught by the ELA. The particular equation is selected randomly by the ELA, and the problem is presented in a problem format randomly selected by the ELA from one of the following four formats:

(1) A format where the first (i.e., left) operand is unknown. This format is indicated by nothing being displayed by either first matrix-eight character 31 or second matrix-eight character 32. At the same time, the LCD displays a particular arithmetic operator by 13-segment array 30, a second operand by third matrix-eight character 33, "=" symbol 36, and a sum, difference, product, or quotient either by fourth matrix-eight character 34 and fifth matrix-eight character 35 together or by fifth matrix-eight character 35 alone.

(2) A format where the arithmetic operator is unknown. This format is indicated by the simultaneous blinking of all of the segments of 13-segment array 30. At the same time, the LCD displays a first operand by first matrix-eight character 31 and second matrix-eight character 32 together or by second matrix-eight character 32 alone; a second operand by third matrix-eight character 33; "=" symbol 36, and a sum, difference, product, or quotient displayed by fourth matrix-eight character 34 and fifth matrix-eight character 35 together or by fifth matrix-eight character 35 alone;

(3) A format where the second (i.e., right) operand is unknown. This format is indicated by nothing being displayed by third matrix-eight character 33 in conjunction with the displaying of a first operand, a particular arithmetic operator, an "=", and a sum, difference, product, or quotient; and (4) Finally, a format where the sum, difference, product, or quotient is unknown. This format is indicated by nothing being displayed by either fourth matrix-eight character 34 or fifth matrix-eight character 35 in conjunction with the displaying of a first operand, a particular arithmetic operator, a second operator, and an "=".

The operator then answers the problem displayed by (a) pushing one of the number keys (0, 1, 2, 3, 4, 5, 6, 7, 8, and 9) if the answer is a single-digit number; (b) pushing one of those keys to enter a digit for the tens column and then again pushing one of those keys to enter a digit for the units column if the answer is a two-digit number; and (c) pushing one of the +, −, ×, and ÷ keys if the answer is a particular arithmetic operation.

If the operator pushes an inappropriate digit, the ELA emits a negative-sounding noise, such as a buzzer noise, by means of a piezoelectric element or transducer (not shown) and displays another randomly selected problem in a randomly selected format. If the operator answers a problem correctly, the ELA emits a positive-sounding noise, such as a melodic chime, and displays another a randomly selected problem in an randomly selected format. This process continues until the operator has attempted to answer 50 problems.

If immediately prior to starting an exercise with the START key, the operator pushes either the +, −, ×, or ÷ key, the ELA will operate the same way with two exceptions. First, the equations randomly selected will all be in the selected arithmetic operation, and second, the problem format where the arithmetic operation is unknown will not be selected.

Finally, if the ELA shown in FIG. 2 is on, pushing the OFF key will turn it off.

Figure 3:
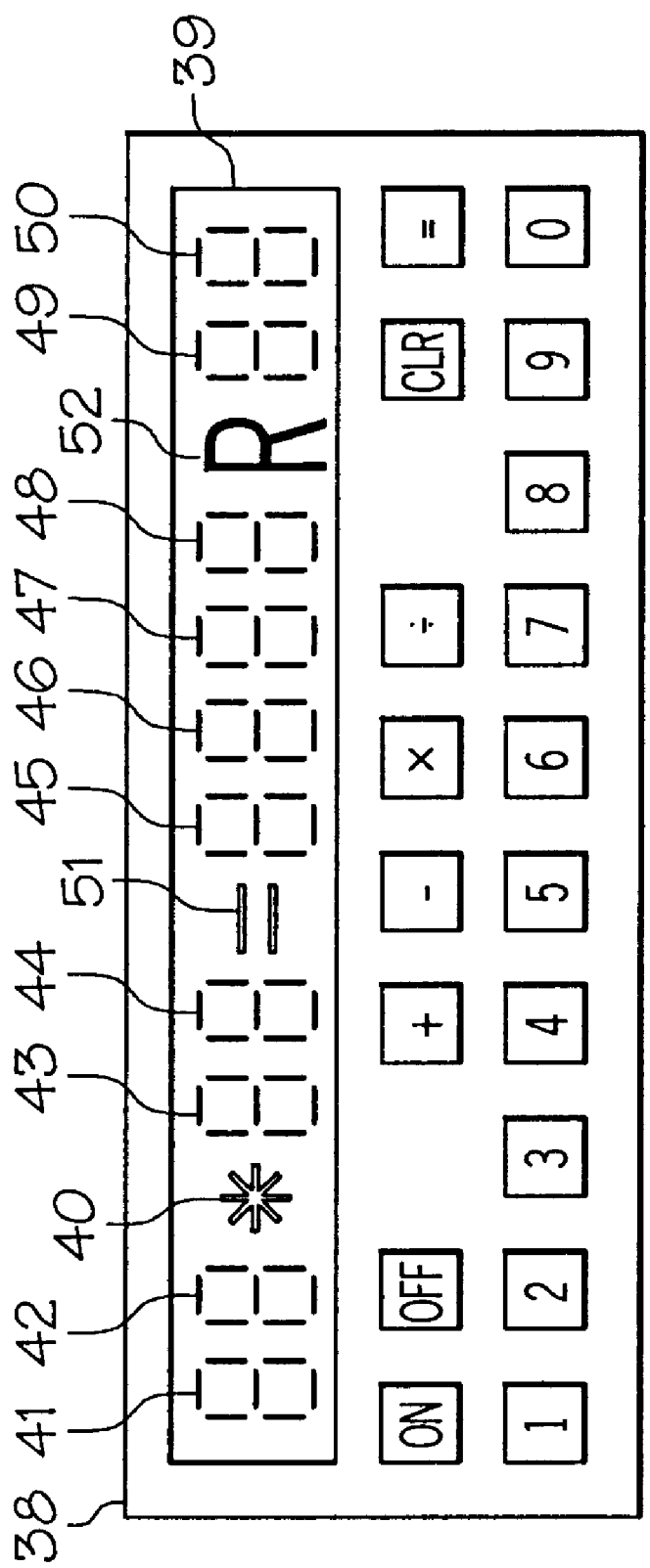
FIG. 3 shows a top schematic view of an electronic calculator for children that embodies the LCD array of FIG. 1A.

FIG. 3 shows a top view of a battery-powered, integrated-chip-based electronic calculator for children that uses the display array of FIG. 1. The calculator has a case 38 that, in this embodiment, is approximately 20 cm wide, 7.6 cm high, and two cm thick. Centered horizontally in the upper portion of the front of case 38 is an LCD 39 that is approximately 17.5 cm wide and 2 cm high. Spanning LCD 39 from left to right are a first matrix-eight character 41 configured in the familiar seven-segment design; a second matrix-eight character 42; a 13-segment array 40 like that shown in FIG. 1A for visually representing either an addition symbol, a subtraction symbol, a multiplication symbol, a division symbol, or all thirteen segments as a composite symbol; a third matrix-eight character 43; a fourth matrix-eight character 44; an "=" symbol 51; a fifth matrix-eight character 45; a sixth matrix-eight character 46; a seventh matrix-eight character 47; an eighth matrix-eight character 48; a little extra open space; a single-segment capital "R" 52 of about the same height as the "matrix 8's"; a ninth matrix-eight character 49; and a tenth matrix-eight character 50. (13-segment array 40 is preferably somewhat larger than shown in FIG. 3.)

The following keys are located in two horizontal rows on the top of case 38 below LCD 39. The lower of the two rows contains, from left to right: the "1", "2", "3", "4", "5", "6", "7", "8", "9", and "0" keys for entering the ten designated digits. The upper row contains, from left to right: an ON key, an OFF key, a + key for designating the arithmetic operation of addition; a − key for designating subtraction; a × key for designating multiplication, a ÷ key for designating division, a CLR key, where "CLR" is an abbreviation for "CLEAR", and a = key.

Pushing the ON key turns on the calculator. As a result, a composite symbol (i.e., segments 10 through 22) and "=" symbol 51 are displayed in LCD 39. The operator can then enter a one or two-digit non-negative whole number as a left operand by pushing the appropriate one or ones of the number keys. In the case of a two-digit left operand, the left digit must be entered first. Then the operator designates the desired arithmetic operation by pushing the +, −, ×, or ÷ key. Next the operator enters a one or two-digit non-negative whole number as a right operand in the same way that left operands are entered. Finally, the operator pushes the = key, which results in the answer to the entered problem being displayed to the right of the "=".

For instance, the answer to "98+100" is displayed as "198" by means of sixth matrix-eight character 46, seventh matrix-eight character 47, and eighth matrix-eight character 48. The answer to "9−15" is displayed as "−6" with the "6" being displayed by eighth matrix-eight character 48 and the "−" being displayed by the middle one of the three horizontal segments of seventh matrix-eight character 47.

The answer to "90×90" is displayed as "8100" by fifth matrix-eight character 45, sixth matrix-eight character 46, seventh matrix-eight character 47, and eighth matrix-eight character 48. And the answer to "50÷26" is displayed as "1" with a remainder of "24". The "1" is displayed by eighth matrix-eight character 48. The remainder "24" is displayed by ninth matrix-eight character 49 and tenth matrix-eight character 50, and the fact that "24" is a remainder is displayed by capital "R" 52.

If a mistake is made when a problem is being entered, pushing the CLR key returns LCD 39 to its status when the calculator was first turned on—the displaying of only the composite symbol and the "=".

When the calculator is on, pushing the OFF key turns it off. If, when the calculator is on, the operator inappropriately pushes a key, a piezoelectric element or transducer (not shown) located inside the calculator emits a negative-sounding noise. For instance if the operator enters a two-digit left operand and then pushes another number key, such as the "3" key, before designating an arithmetic operation, the calculator will emit such a noise.

Figure 4:
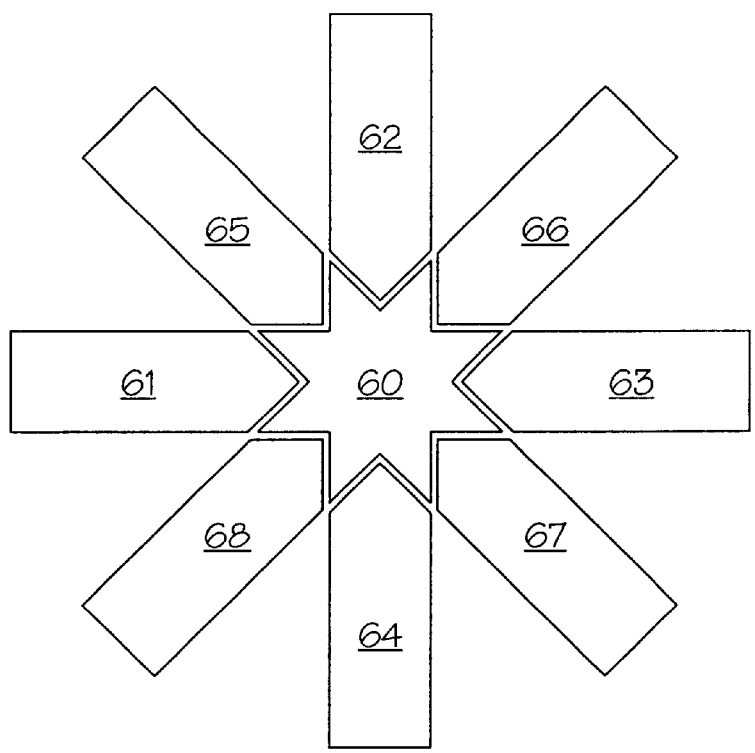
FIG. 4 shows a schematic graphic layout of an LCD array with a 16-sided central segment and eight additional segments in accordance with the invention.

FIG. 4 shows a schematic top view of an LCD array with nine segments. The array is an alternative embodiment of our display array and displays, one symbol at a time, essentially true representations of the addition symbol, the multiplication symbol, and a composite symbol consisting of all nine segments. Thus, the principal difference between this array and the one shown in FIG. 1A is that this array cannot display subtraction and division symbols and, therefore, is composed of fewer segments. In this array, as in that shown in FIG. 1A, the displayable symbols are centered at the same point, and segments that would otherwise be contiguous are separated by the usual gap. Here too, for simplicity of discussion, the symbols are sometimes dealt with below as if the gap did not exist.

The addition symbol (+) is configured like an upright, horizontally and vertically symmetrical, two-dimensional cross. The multiplication symbol (×) is configured like a horizontally and vertically symmetrical, two-dimensional cross with arms of equal length that has been rotated 45 degrees from an upright position.

The external dimensions of the LCD array and of the addition and multiplication symbols are the same as those in the preferred embodiment's array shown in FIG. 1A.

Segment 60 is a vertically and horizontally symmetrical segment which is bordered by sixteen straight sides, is in the center of the array, and is coincident with the entire intersection of the addition symbol and the multiplication symbol. As a result, segment 60 is shaped like an eight-pointed star. Each point of the star is an outwardly-pointed, 45-degree angle. The two sides connecting each pair of consecutive points form an inwardly-pointed, 90-degree angle. The eight such inwardly-pointed, 90-degree angles of segment 60 are oriented in such a way that they would be bisected by rays emanating from the center of segment 60 at 0 degrees, 45 degrees, 90 degrees, 135 degrees, 180 degrees, 225 degrees, 270 degrees, and 315 degrees.

Extending out, yet spaced from central segment 60, is a series of radial segments as follows: Segment 61 is a horizontally extending, pentagonal segment which is located adjacent the leftmost inwardly-pointed, 90-degree angle of segment 60. The right end of segment 61 is made up of two straight lines of equal length forming an outwardly-pointed 90-degree angle. Segment 61 is coincident with that portion of the addition symbol that extends to the left of segment 60 except for the usual gap between the tapered end of segment 61 and the just-referenced angle of segment 60.

Segment 62 is a vertically extending, pentagonal segment which is located adjacent the uppermost inwardly-pointed, 90-degree angle of segment 60. The lower end of segment 62 is made up of two straight lines of equal length forming an outwardly-pointed 90-degree angle. Segment 62 is coincident with that portion of the addition symbol that extends above segment 60 except for the usual gap between the tapered end of segment 62 and the just-referenced angle of segment 60.

Segment 63 is a horizontally extending, pentagonal segment which is located adjacent the rightmost inwardly-pointed, 90-degree angle of segment 60. Segment 63 is a symmetrical mirror image of segment 61.

Segment 64 is a vertically extending, pentagonal segment which is located adjacent the lowest inwardly-pointed, 90-degree angle of segment 60. Segment 64 is a symmetrical mirror image of segment 62.

A pentagonal segment 65 is coincident with the upper left arm of the multiplication symbol except where that arm overlaps segment 60 and except for the usual gap separating segment 65 from segment 60. Thus, segment 65 is diagonally positioned with respect to the array and slants up to the left. It is squared off at its upper left end which is about 1.8-mm wide. Its lower right end is made up of two straight lines of equal length—one horizontal and one vertical—forming an outwardly-pointed, 90-degree angle. Segment 65 is symmetrical with respect to the imaginary straight line that bisects that angle and is separated—along the just-referenced horizontal and vertical lines—from segment 60 by the usual gap.

A pentagonal segment 66 is coincident with the upper right arm of the multiplication symbol except where that arm overlaps segment 60 and except for the usual gap separating segment 66 from segment 60. Thus, segment 66 is diagonally positioned with respect to the array and slants up to the right. It is a symmetrical mirror image of segment 65, taken across a straight vertical imaginary line that bisects segment 60.

A pentagonal segment 67 is coincident with the lower right arm of the multiplication symbol except where that arm overlaps segment 60 and except for the usual gap separating segment 67 from segment 60. Thus, segment 67 is diagonally positioned with respect to the array and slants down to the right. It is a symmetrical mirror image of segment 66, taken across a straight horizontal imaginary line that bisects segment 60.

A pentagonal segment 68 is coincident with the lower left arm of the multiplication symbol except where that arm overlaps segment 60 and except for the usual gap separating segment 68 from segment 60. Thus, segment 68 is diagonally positioned with respect to the array and slants down to the left. It is a symmetrical mirror image of segment 65, taken across a straight horizontal imaginary line that bisects segment 60.

Segments 65, 66, 67, and 68 are congruent.

Segment 60 displays the center of both the addition and multiplication symbols. Segments 60, 61, 62, 63, and 64 are actuated to display the addition symbol. Segments 60, 65, 66, 67, and 68 are actuated to display the multiplication symbol. All nine segments are actuated to display a composite symbol.

Each segment has a conventional individual conductive lead (not shown) which connects to a unique pin (not shown), and all segments share a single backplane electrode (not shown). All of the segments can be actuated individually by conventional "direct drive" LCD technology (not shown). In general, this embodiment is manufactured using standard technology well known to persons skilled in the art and used in the design and manufacture of LCD's for battery-powered, handheld calculators and games that have long been sold to the public.

This embodiment is useful for, among other things, portable electronic devices that teach addition and multiplication, but not—at least, directly—subtraction and division. Because it does not need to display the subtraction or division symbols, it uses fewer segments to display the addition and multiplication symbols, and its representations of these symbols consequently have fewer inter-segment gaps and therefore appear even more filled-out than they otherwise would.

Figure 5:
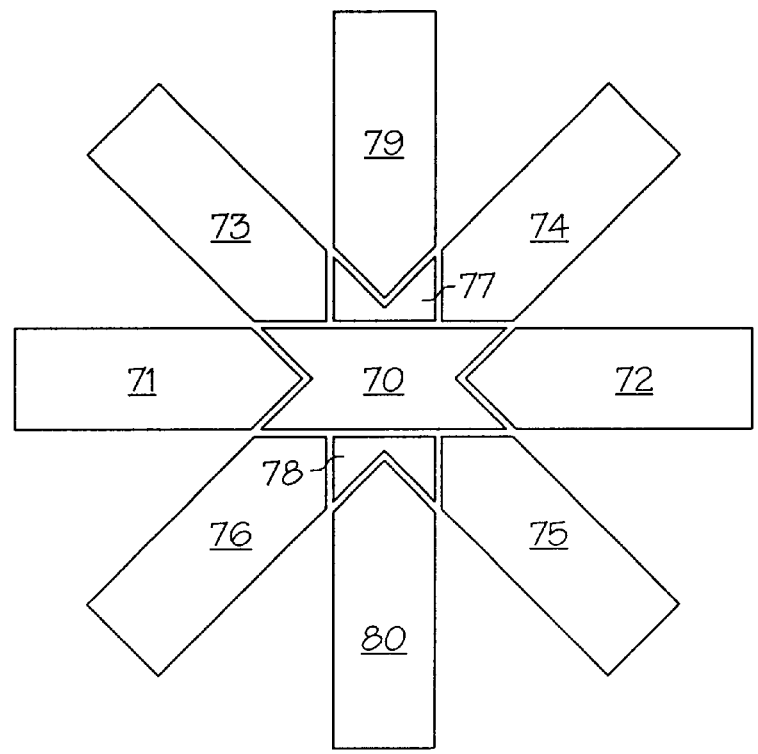
FIG. 5 shows a schematic graphic layout of an LCD array with a hexagonal central segment and 10 additional segments in accordance with the invention.

FIG. 5 shows a schematic top view of an LCD array with eleven segments. The array is an alternative embodiment of our display array and displays, one symbol at a time, essentially true representations of the addition symbol (+), the subtraction symbol (−), the multiplication symbol (×), and a composite symbol consisting of all eleven segments. Thus, the principal difference between this array and that of the preferred embodiment shown in FIG. 1A is that this array cannot display the division symbol (÷) and, therefore, is composed of two fewer segments.

In this array, as in that of the preferred embodiment, the displayable symbols are centered at the same point, and segments that would otherwise be contiguous are separated by the usual gap. Here too, for simplicity of discussion, the symbols are sometimes dealt with below as if the gap did not exist. The shapes and dimensions of the addition, subtraction, and multiplication symbols are—although by no means necessarily—the same as those of the preferred embodiment.

Segment 70 is a hexagonal display segment which is in the center of the array. Segment 70 is configured and located in the array just as segment 10 is configured and located in the 13-segment array of the preferred embodiment.

Extending out, yet spaced from central segment 70, is a series of radial segments as follows: Segment 71 is a horizontally extending, pentagonal segment which is located adjacent the left end of segment 70. Segment 71 is configured and located in the array just as segment 11 is configured and located in the 13-segment array of the preferred embodiment.

Segment 72 is a horizontally extending, pentagonal segment which is located adjacent the right end of segment 70. Segment 72 is a symmetrical mirror image of segment 71.

Segment 77 is an indented, pentagonal segment which is located adjacent the center of the top of segment 70. Segment 77 is configured and located in the array just as segment 17 is configured and located in the 13-segment array of the preferred embodiment.

Segment 78 is an indented, pentagonal segment which is located adjacent the center of the base of segment 70. Segment 78 is a symmetrical mirror image of segment 77.

Segment 79 is a downwardly-pointed, pentagonal segment which is located directly above and adjacent segment 77. The top of segment 79 measures about 1.8 mm and is about 4.25 mm above the upper edge of segment 70. The bottom of segment 79 is made up of two straight lines forming an outwardly-pointed, 90-degree angle. The usual gap separates the tapered bottom of segment 79 from the inwardly-pointed top of segment 77. The left and right sides of segment 79 are straight and perpendicular to its top and are in line with the left and right sides of segment 77.

Segment 80 is an upwardly-pointed, pentagonal segment which is located directly below and adjacent segment 78. Segment 80 is a symmetrical mirror image of segment 79.

A pentagonal segment 73 is coincident with the upper left arm of the multiplication symbol except where that arm overlaps segment 70 and segment 77 and except for the usual gaps separating segment 73 from segment 70 and segment 77. Thus, segment 73 is diagonally positioned with respect to the 11-segment array and slants up to the left. Segment 73 is configured and located in the array just as segment 13 is configured and located in the 13-segment array of the preferred embodiment.

A pentagonal segment 74 is diagonally positioned with respect to the 11-segment array and slants up to the right. It is a symmetrical mirror image of segment 73, taken across a straight vertical imaginary line that bisects segment 70.

A pentagonal segment 75 is diagonally positioned with respect to the 11-segment array and slants down to the right. It is a symmetrical mirror image of segment 74, taken across a straight horizontal imaginary line that bisects segment 70.

A pentagonal segment 76 is diagonally positioned with respect to the 11-segment array and slants down to the left. It is a symmetrical mirror image of segment 73, taken across a straight horizontal imaginary line that bisects segment 70.

Segments 73, 74, 75, and 76 are congruent.

Hexagonal segment 70 displays the center of each of the addition, subtraction, and multiplication symbols. Segments 70, 71, 72, 77, 78, 79, and 80 are actuated to display the addition symbol. Segments 70, 71, and 72 are actuated to display the subtraction symbol. Segments 70, 73, 74, 75, 76, 77, and 78 are actuated to display the multiplication symbol. All eleven segments are actuated to display a composite symbol.

This embodiment is useful for, among other things, portable electronic devices that teach addition, subtraction, and multiplication, but not—at least, directly—division. Because it does not need to display the division symbol, it uses two fewer segments to display the addition symbol than does the 13-segment display of the preferred embodiment, and its representation of this symbol consequently has two fewer inter-segment gaps and therefore appears even more filled-out than it otherwise would.

Figure 6:
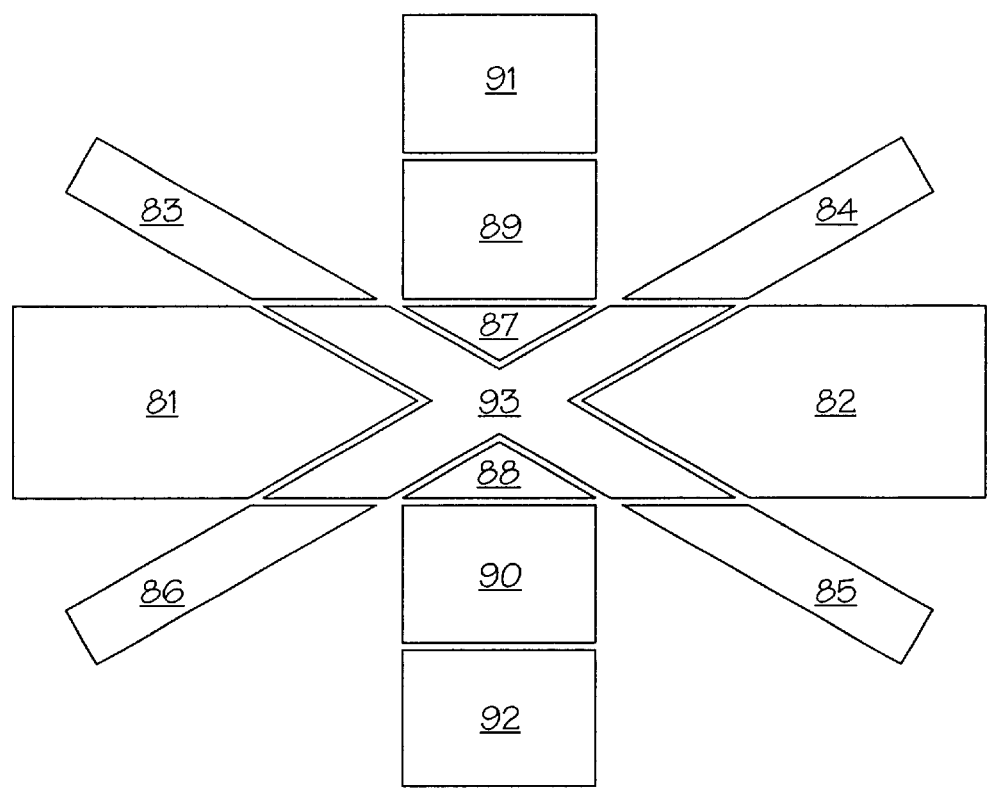
FIG. 6 shows a schematic graphic layout of an LCD array with a 12-sided central segment and twelve additional segments in accordance with the invention.

FIG. 6 shows a schematic top view of an LCD array with thirteen segments, including a 12-sided central segment 93. The array is an alternative embodiment of an electronically actuated visual display array and displays, one symbol at a time, essentially true representations of an addition symbol, a subtraction symbol, a multiplication symbol, a division symbol, and a composite symbol consisting of all thirteen segments. All the symbols are centered at the same point—the geometric center of the 12-sided central segment. All segments that would otherwise be contiguous are separated by the usual gap. For simplicity of discussion, the symbols are sometimes dealt with below as if the gap did not exist.

The instant array displays an addition symbol (+) configured like an upright, horizontally and vertically symmetrical, two-dimensional cross. The subtraction symbol (−) is configured like an elongated, horizontally positioned rectangle and is coincident with the horizontal portion of the addition symbol. The division symbol (÷) combines the subtraction symbol with two rectangles—one of the rectangles centered a certain distance above the subtraction symbol, one of them centered the same distance below it, and both of them parallel to it. The multiplication symbol (×)—unlike those displayed by the previously-discussed embodiments—has a shape that results from the crossing of two congruent, elongated rectangles at their centers so that they form a 60-degree angle on the left and right sides of their intersection and a 120-degree angle on the upper and lower sides of their intersection. As a result, the multiplication symbol appears somewhat flattened. In addition, the arms of the multiplication symbol are less thick than those of the addition symbol. In this embodiment, each has a thickness equal to the thickness of an arm of the addition symbol multiplied by the quotient obtained by dividing two into the difference obtained by subtracting one from the square root of three.

Measured from its extremities which are the same as those of the addition symbol, the LCD array in one embodiment is about 11-mm high and 11-mm wide. The horizontal and vertical arms of the addition symbol are rectangular, and their ends measure about 2.54 mm. The subtraction symbol obviously has the same dimensions and shape as the horizontal portion of the addition symbol. The two crossed rectangles forming the multiplication symbol are about 12-mm long and measure about 0.93 mm at their ends. (This end dimension should equal the product of the end dimension of the arms of the addition symbol—here, approximately 2.54 mm—multiplied by the quotient obtained by dividing two into the difference obtained by subtracting one from the square root of three.) The bottom edge of the upper left arm and the top edge of the lower left arm form a 60-degree angle, and the top edge of the upper left arm and the top edge of the upper right arm consequently form a 120-degree angle. The division symbol's upper and lower rectangles are both about 2.54-mm wide and 1.96 mm high and are each located about 2.26 mm from the nearest edge of the elongated horizontal rectangle that constitutes the center of the division symbol.

Display segment 93 has twelve straight sides and is in the center of the array. Segment 93 is coincident with the entire intersection of the multiplication and subtraction symbols. Thus, segment 93 is shaped symmetrically with respect to vertical and horizontal axes bisecting it and those symbols. It has three sides in each of the four quadrants created by those axes. Because of its vertical and horizontal symmetry, a description of the three sides in any one of the four quadrants is sufficient to locate the other nine sides. Their lengths are described relative to the end dimension of the addition symbol (here, approximately 2.54 mm), which is algebraically referred to as "E". The intersection of the just-referenced horizontal and vertical axes, of course, is the geometric center of segment 93.

The lower right end of an upper left, bottom oblique side of segment 93 (i.e., the underside of the segment's upper left arm) is located directly to the left of the geometric center of segment 93. The distance between the two points equals the product of E multiplied by the difference obtained by subtracting one-half from the quotient obtained by dividing two into the square root of three. The upper left, bottom oblique side extends from its lower right end at an angle of 300 degrees (0 degrees being straight up) for a distance equal to E to its upper left end. An upper left horizontal side of segment 93 extends from that upper left end directly to the right for a distance equal to the difference obtained by subtracting one from the square root of three. An upper left, top oblique side of the central segment extends from the right end of the upper left horizontal side at an angle of 120 degrees for a distance equal to the product of E multiplied by the quotient obtained by dividing three into the square root of three. The lower right end of the upper left, top oblique side is on the vertical axis bisecting segment 93 and is above the segment's geometric center by a distance equal to the product of E multiplied by the difference obtained by subtracting from one-half the quotient obtained by dividing six into the square root of three.

Central segment 93 has an upper right, bottom oblique side. It and the upper left, bottom oblique side are symmetrical relative to the vertical axis bisecting the segment. The segment also has a lower left, top oblique side and a lower right, top oblique side. The former and the upper left, bottom oblique side are symmetrical relative to the horizontal axis bisecting the segment, and so are the latter and the upper right, bottom oblique side.

Central segment 93 has an upper right horizontal side. It and the upper left horizontal side are symmetrical relative to the vertical axis bisecting the segment. The segment also has a lower left horizontal side and a lower right horizontal side. The former and the upper left horizontal side are symmetrical relative to the horizontal axis bisecting the segment, and so are the latter and the upper right horizontal side.

Segment 93 has an upper right, top oblique side. It and the upper left, top oblique side are symmetrical relative to the vertical axis bisecting the segment. The segment also has a lower left, bottom oblique side and a lower right, bottom oblique side. The former and the upper left, top oblique side are symmetrical relative to the horizontal axis bisecting the segment, and so are the latter and the upper right, top oblique side.

As a result, the basic shape of central segment 93 resembles a flattened "X".

Extending out, yet spaced from segment 93, is a series of radial segments as follows:

Segment 81 is a horizontally extending, pentagonal segment which is located adjacent the left end of segment 93. The right end of segment 81 is made up of two straight lines of equal length forming an outwardly-pointed 60-degree angle. Segment 81 is coincident with that portion of the subtraction symbol that extends to the left of segment 93 except for the usual gap between the tapered right end of segment 81 and the inwardly-pointed left end of segment 93.

Segment 82 is a horizontally extending, pentagonal segment which is located adjacent the right end of segment 93. Segment 82 is a symmetrical mirror image of segment 81.

The upper left, top oblique side and the upper right, top oblique side of central segment 93 form a 120-degree V-shaped indentation into the top of that segment. An upper isosceles-triangle segment 87 points down into that indentation and fills it except for the usual gap between the upper left and upper right, top oblique sides of segment 93 and lower left and lower right sides of segment 87, which lower left and lower right sides are equal in length. The third side of segment 87 is aligned with segment 93's upper left and upper right horizontal sides.

The lower left, bottom oblique side and the lower right, bottom oblique side of central segment 93 form a 120-degree V-shaped indentation into the bottom of that segment. A lower isosceles-triangle segment 88 points up into that indentation and fills it except for the usual gap between the lower left and lower right, bottom oblique sides of segment 93 and upper left and upper right sides of segment 88, which upper left and upper right sides are equal in length. The third side of segment 88 is aligned with the lower left and lower right horizontal sides of segment 93. Segment 88 is a symmetrical mirror image of segment 87.

A rectangular segment 91 is coincident with the highest component of the three-component division symbol. Segment 91's approximately 2.54-mm bottom side is parallel to, horizontally centered with respect to, and about 2.26 mm above the horizontal side of upper isosceles-triangle segment 87.

A rectangular segment 92 is coincident with the lowest, approximately-square rectangular component of the three-component division symbol. Segment 92 is a symmetrical mirror image of segment 91.

A rectangular segment 89 is located between segments 91 and 87. The top of segment 89 measures about 2.54 mm and is located directly below the base of segment 91. The bottom of segment 89 is located above the horizontal side of upper isosceles-triangle segment 87. The left and right sides of segment 89 are aligned with segment 91's left and right sides, respectively. Thus, segment 89 is coincident with that portion of the upper arm of the addition symbol that is below the bottom of segment 91 and above the top of segment 87 except for the usual gaps that separate segment 89 from segment 91 and segment 87.

A rectangular segment 90 is located between segments 92 and 88. Segment 90 is a symmetrical mirror image of segment 89.

A trapezoidal segment 83 is coincident with the upper left arm of the multiplication symbol except where that arm overlaps segment 93 and except for the usual gap separating segment 83 from segment 93. Thus, segment 83 is diagonally positioned with respect to the array and slants up to the left. It is squared off at its upper left end which measures about 0.93 mm. Its lower right side is horizontal and forms a 150-degree angle with the bottom one of its oblique parallel sides and a 30-degree angle with the top one of those sides. Segment 83 is separated—along the just-referenced horizontal line—from segment 93 by the usual gap.

A second trapezoidal segment 84 is coincident with the upper right arm of the multiplication symbol except where that arm overlaps segment 93 and except for the usual gap separating segment 84 from segment 93 Thus, segment 84 is diagonally positioned with respect to the array and slants up to the right. It is a symmetrical mirror image of segment 83, taken across a straight vertical imaginary line that bisects segment 93.

A third trapezoidal segment 85 is coincident with the lower right arm of the multiplication symbol except where that arm overlaps segment 93 and except for the usual gap separating segment 85 from segment 93 Thus, segment 85 is diagonally positioned with respect to the array and slants down to the right. It is a symmetrical mirror image of segment 84, taken across a straight horizontal imaginary line that bisects segment 93.

A fourth trapezoidal segment 86 is coincident with the lower left arm of the multiplication symbol except where that arm overlaps segment 93 and except for the usual gap separating segment 86 from segment 93 Thus, segment 86 is diagonally positioned with respect to the array and slants down to the left. It is a symmetrical mirror image of segment 83, taken across a straight horizontal imaginary line that bisects segment 93.

Segments 83, 84, 85, and 86 are congruent.

Segment 93 displays the center of each of the four arithmetic operation symbols. Segments 93, 81, 82, 87, 88, 89, 90, 91, and 92 are actuated to display the addition symbol. Segments 93, 81, 82, 87, and 88 are actuated to display the subtraction symbol. Segments 93, 83, 84, 85, and 86 are actuated to display the multiplication symbol. Segments 93, 81, 82, 87, 88, 91, and 92 are actuated to display the division symbol. All thirteen segments are actuated to display a composite symbol.

The instant alternative embodiment is manufactured using technology like that used for the manufacture of the preferred embodiment and is appropriate for the same uses for which the preferred embodiment is useful. Its multiplication symbol has fewer inter-segment gaps than that of the preferred embodiment but a thinner and somewhat-flattened appearance.

Just as the 11-segment array shown in FIG. 5 is a simpler, non-division alternative of the preferred embodiment 's 13-segment array, so too is there a simpler, non-division, 11-segment alternative (not shown) to the 13-segment array shown in FIG. 6. Similarly, just as the 9-segment array shown in FIG. 4 is a simpler, non-subtraction, non-division alternative of the preferred embodiment's 13-segment array, so also is there a simpler, non-subtraction, non-division, 9-segment alternative (not shown) to the 13-segment array shown in FIG. 6.

In general, the array shown in FIG. 6 is just one example of possible arrays with triangular segments above and below a 12-sided central segment. The multiplication symbols of all those arrays share the following two common characteristics: (1) arms that are flatter than those of such a symbol with perpendicular arms, and (2) arms that are thinner than those of the addition symbol displayed by the same array.

FIG. 6 is also just one example of an embodiment with an array that displays a multiplication symbol having non-perpendicular arms. Other embodiments that display multiplication symbols with arms that are not perpendicular but that are substantially closer to being perpendicular than those in FIG. 6 have arrays very similar to that shown in FIG. 1A, except the angles of the points and indentations of the various segments do not equal 90 degrees.

Figure 7:
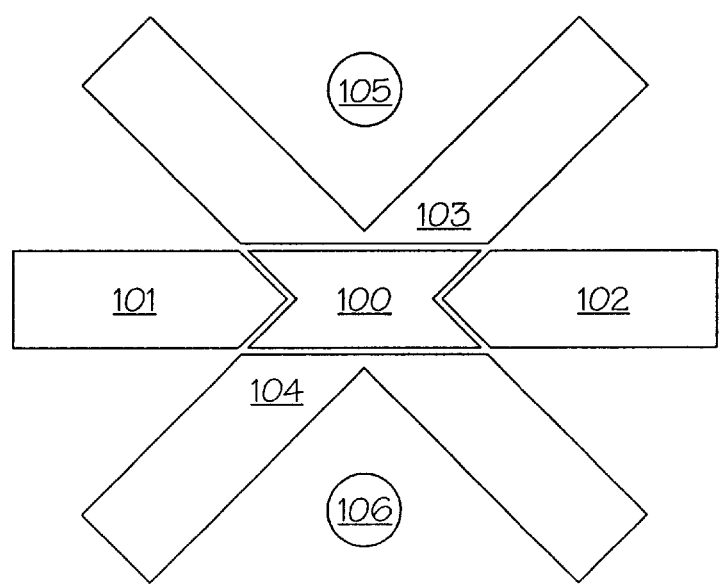
FIG. 7 shows a schematic graphic layout of an LCD array with a hexagonal central segment and six additional segments in accordance with the invention.

FIG. 7 shows a schematic top view of an LCD array with seven segments. The array is an alternative embodiment of our display array and displays, one symbol at a time, essentially true representations of the multiplication symbol, the division symbol, the subtraction symbol, and a composite symbol consisting of all seven segments.

In this seven-segment array, as in that of the preferred embodiment, the displayable symbols are centered at the same point, and segments that would otherwise be contiguous are separated by the usual gap. Here too, for simplicity of discussion, the symbols are sometimes dealt with below as if the gap did not exist. The shape and dimension of the multiplication symbol, the subtraction symbol, and the vertically-centered portion of the division symbol displayable by the seven-segment array are—although not necessarily—the same as those of the preferred embodiment. The upper and lower "dots" of the division symbol are—although not necessarily—circular, not rectangular as they are in the preferred embodiment.

A hexagonal display segment 100 is in the center of the array. Segment 100 is configured and located in the array just as segment 10 is configured and located in the 13-segment array of the preferred embodiment.

Segment 101 is a horizontally extending, pentagonal segment which is located adjacent the left end of segment 100. Segment 101 is configured and located in the array just as segment 11 is configured and located in the 13-segment array of the preferred embodiment.

Segment 102 is a horizontally extending, pentagonal segment which is located adjacent the right end of segment 100. Segment 102 is a symmetrical mirror image of segment 101.

A seven-sided segment 103 configured approximately like a broad, bold-faced "v" with a flattened tip is located adjacent the center of the top of segment 100. Segment 103 is configured and located in the array just as would be configured and located a combination, into a single segment, of segments 13, 14, and 17 and the two gaps separating them in the 13-segment array of the preferred embodiment.

A seven-sided segment 104 is located adjacent the center of the base of segment 100. Segment 104 is a symmetrical mirror image of segment 103.

A circular segment 105 is coincident with the higher circular component of the three-component division symbol.

Segment 105's diameter is about 1.8 mm, and its center is horizontally centered with respect to, and about 3.35 mm above, the upper edge of segment 100.

A circular segment 106 is coincident with the lower circular component of the three-component division symbol. Segment 106 is a symmetrical mirror image of segment 105.

Hexagonal segment 100 displays the center of each of the multiplication, division, subtraction, and composite symbols. Segments 100, 103, and 104 are actuated to display the multiplication symbol. Segments 100, 101, 102, 105, and 106 are actuated to display the division symbol. Segments 100, 101, and 102 are actuated to display the subtraction symbol. All seven segments are actuated to display a composite symbol.

Each segment has a conventional individual conductive lead (not shown) which connects to a unique pin (not shown), and all segments share a single backplane electrode (not shown). All of the segments can be actuated individually by conventional "direct drive" LCD technology (not shown). In general, this embodiment is manufactured using standard technology well known to persons skilled in the art and used in the design and manufacture of LCD's for battery-powered, handheld calculators and games that have long been sold to the public. This embodiment is useful for, among other things, portable electronic devices that teach multiplication, division, and subtraction. Because it does not need to display the addition symbol, it uses six fewer segments than does the 13-segment display of the preferred embodiment, and its representation of the multiplication symbol uses four fewer segments and consequently has four fewer inter-segment gaps and therefore appears even more filled-out than it otherwise would.

Another embodiment is just like the one just described, except that it does not display a subtraction symbol. It uses a seven-segment array just like the one described except that the combination of segments 100, 101, and 102 is not separately actuated to display a subtraction symbol. It uses those three segments only to display part of the division symbol or part of the composite symbol.

Still another embodiment (not shown) is also like the seven-segment array described above that can display subtraction, multiplication, and division symbols, except that this other embodiment would consist of only the five segments 100, 101, 102, 103, and 104 and cannot display a division symbol, just a subtraction symbol and a multiplication symbol.

Figure 8:
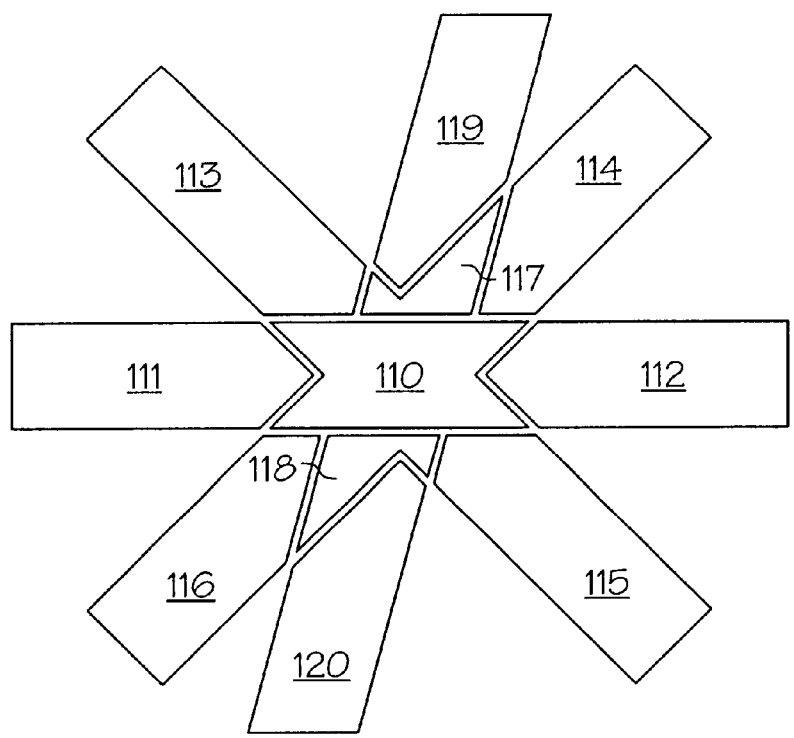
FIG. 8 shows a schematic graphic layout of a vertically and horizontally asymmetrical LCD array in accordance with the invention.

FIG. 8 shows a schematic top view of one example of a display array that displays at least some of the arithmetic symbols or parts of them rotated slightly from the normal vertically and horizontally symmetrical orientation. Specifically, FIG. 8 shows an 11-segment display array which can display the addition symbol, the subtraction symbol, the multiplication symbol, and a composite symbol, but no division symbol, where the upward and downward arms of the addition symbol are displayed rotated ten degrees clockwise from their normal upright orientation. This might be done to maintain visual consistency with related digits that are displayed at a slight angle (as is commonly the case where digits are displayed by means of a seven-segment matrix-eight).

The display array shown in FIG. 8 is similar to that shown in FIG. 5. Each array has eleven segments. Segments 110, 111, and 112 shown in FIG. 8 are identical to segments 70, 71, and 72, respectively. Segments 113, 114, 115, 116, 117, 118, 119, and 120 shown in FIG. 8 differ from segments 73, 74, 75, 76, 77, 78, 79, and 80, respectively, only insofar as the boundaries of all of the former are affected by the need to maintain the usual 0.15-mm gap between them and by the ten-degree clockwise rotation of the rectangle represented by segments 77, 78, 79, and 80 (and the appropriate square portion of central segment 70) to produce the rectangle represented by segments 117, 118, 119, and 120 (and the appropriate parallelogram-shaped portion of central segment 110).

Unlike segments 77 and 78 in the array shown in FIG. 5, segments 117 and 118 are not symmetrical mirror images of each other. And unlike segments 79 and 80 shown in FIG. 5, segments 119 and 120 are not symmetrical mirror images of each other. But segments 117 and 118 are congruent, and so are segments 119 and 120. Note, however, for instance, that the left side of segment 117 "corresponds" (and, therefore, is congruent) with the right side of segment 118, and that the right side of segment 119 corresponds with the left side of segment 120. Similarly, segments 113, 114, 115, and 116 are not vertically or horizontally symmetrical with each other, but segments 113 and 115 are congruent, and so are segments 114 and 116.

Except for the just-explained differences in the shaping of segments, the display array shown in FIG. 8 is designed and constructed just like that shown in FIG. 5.

In other asymmetrical embodiments of the display array, the multiplication symbol is displayed slightly rotated from its normal upright position. The array's segments are shaped accordingly.

In still other asymmetrical embodiments of the array, the upper and lower "dots" of the division symbol are similarly relocated relative to the center of the display. If the dots are quadrilaterals, preferably their upper and lower sides are parallel with the upper and lower sides of the central segment of the array. If that array can also display an addition symbol, the slanted upper and lower arms of the addition symbol necessarily are not perpendicular to their ends. Alternatively, if the dots of the division symbol are circular, the ends of all four arms of any addition symbol are rounded, and, for the sake of visual consistency, preferably those of the arms of the multiplication symbol as well.

In still other asymmetrical embodiments of the display array, the left and right ends of the horizontal segments positioned to the left and right of the central segment are slightly slanted while the upper and lower sides or those segments remain horizontal.

Of course, the foregoing are just examples, and other similar asymmetrical alternative embodiments exist, including different combinations of those just mentioned as well as asymmetrical embodiments which, like those illustrated in FIG. 1A, FIG. 4, and FIG. 7, have more or fewer than the eleven segments shown in FIG. 5.

Although none of these alternative embodiments of the display array is either vertically or horizontally symmetrical, preferably each of them is divisible into congruent left and right sections and congruent upper and lower sections by an imaginary vertical axis and an imaginary horizontal axis, respectively. In this sense, each of these arrays is analogous to a non-rectangular parallelogram which is neither vertically nor horizontally symmetrical but, when lying flat, is similarly divisible into congruent left and right sections and congruent upper and lower sections.

Figure 9:
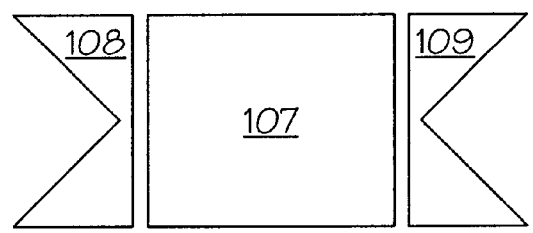
FIG. 9 shows a schematic graphic layout of a central segment group of three segments.

FIG. 9 shows a schematic top view of one example of a segment group (i.e., two to five adjacent segments) that can be actuated as a group instead of what would otherwise be a single segment in a display array that displays arithmetic operation symbols. The segment group shown in FIG. 9, when actuated as a group, displays the central portion of a multiplication symbol and of one or more other displayable arithmetic operation symbols. This central portion of the symbols includes essentially the entire intersection of (a) the multiplication symbol and (b) an essentially horizontal bar constituting the entire subtraction symbol, the horizontal portion of the addition symbol, and/or the vertically-centered portion of the division symbol, depending on which of these other symbols can also be displayed. Such a "central segment group"—whether it consists of three adjacent segments, as it does here, or two, four, or five adjacent segments—can be effectively used—although in some ways less so, as explained below—in the place of the central segment contemplated in the arrays shown in FIG. 1A, FIG. 2, FIG. 3, FIG. 5, and FIG. 7. One or more segment groups can also be used instead of one or more segments that are not a central segment.

The central segment group illustrated in FIG. 9 includes the following three adjacent (i.e., virtually or actually touching) segments: a middle segment 107, a left segment 108, and a right segment 109. Although segment 108 is not adjacent segment 109, segments 107, 108, and 109 are "adjacent" for the purpose of the definition of "segment group" because segment 108 is adjacent segment 107, and segment 107 is adjacent segment 109.

Segment 107 is essentially an upright square with sides of 1.8 mm. Segment 108 has a vertical right side positioned to the left of, and equal in length with, the left vertical side of segment 107. Segment 109 has a vertical left side positioned to the right of, and equal in length with, the right vertical side of segment 107. A gap of approximately 0.15 mm separates the right side of segment 108 and the left side of segment 109 from the left and right sides of segment 107, respectively. Segments 108 and 109 are pentagons configured so that, except for the just-described gaps separating them from segment 107, the three-segment central segment group can display a hexagon identical with the one that can be displayed by segment 10 in the array shown in FIG. 1A. Thus, the "external shape" and "boundaries" of the segment group set can be described just like the shape and boundaries of segment 10.

One advantage of a segment group is that it allows greater flexibility. For instance, the central segment group shown in FIG. 9 has middle segment 107 which can be displayed by itself instead of a composite symbol consisting of all the array's segments—for instance, to indicate to a user that the user needs to consider selecting one of the possible arithmetic operations.

Probably the most significant disadvantage of a segment group is that, because of the gaps separating its component segments, when it is used to display an arithmetic symbol, the representation of the symbol will appear less solid than in an otherwise identical array not using a segment group. For instance, an array that is otherwise identical to that shown in FIG. 1A but that uses the central segment group shown in FIG. 9 instead of a single central segment like segment 10 displays a less solid representation of each of the four basic arithmetic operator symbols than does the array shown in FIG. 1A.

A second disadvantage of a segment group is that it uses more complex circuitry, more microprocessor control, and more complex programming.

Because of all these disadvantages, segment groups with many component segments can be impractical. In fact, a central segment group including more than five component segments might not be workable.

The term "segment set" means a segment or a segment group. Thus, a segment set consists of a single segment or two to five adjacent segments. The "boundaries" of a segment set are the boundaries of the segment or the segment group that constitutes the segment set. Similarly, the "external shape" of a segment set is the shape of the segment or the external shape of the segment group that constitutes the segment set.

It will be apparent that we have provided a greatly improved electronically actuated visual display array. Even within the physical and financial constraints of providing an inexpensive portable device, it can clearly and relatively fully display the multiplication symbol and one or more of the addition, subtraction, and division symbols in the same appropriate location and in appropriate proportions relative to other displayed symbols (often, numbers) to which they relate. Whether used in school, at home, or in business, our electronic display arrays can be read more quickly and easily because they display in a single appropriate location appropriately-sized representations of arithmetic operation symbols that closely resemble customary representations of them found in printed matter. Consequently, these display arrays will significantly enhance arithmetic teaching devices, calculators, and other relatively inexpensive and/or relatively small devices that display symbols for multiplication and at least one of the other basic arithmetic operations.

Although the description above contains many specifics, they should not be construed as limiting the scope of the invention but as merely providing illustrations of some of the currently preferred embodiments of the invention. Other embodiments are possible.

One alternative embodiment (not shown) uses a 13-segment array that displays, one symbol at a time, essentially true representations of a multiplication symbol, an addition symbol, a division symbol, and a composite symbol consisting of all thirteen segments. This array can, for instance, be like that of the preferred embodiment shown in FIG. 1A, except that it does not display its equivalents of segments 10, 11, and 12 alone as a group as a subtraction symbol. Similar alternative embodiments (not shown) use a similar 13-segment display to display (a) multiplication, addition, subtraction, and composite symbols, but not a division symbol, (b) multiplication, addition, and composite symbols, but neither a subtraction nor a division symbol, (c) multiplication, division, subtraction, and composite symbols, but not an addition symbol, (d) multiplication, division, and composite symbols, but neither an addition symbol nor a subtraction symbol, or (e) multiplication, subtraction, and composite symbols, but neither an addition nor a division symbol.

Another alternative embodiment (not shown) uses an electronically actuated 11-segment array that displays, one symbol at a time, essentially true representations of a multiplication symbol, a subtraction symbol, a division symbol, and a composite symbol consisting of all eleven segments. Thus, the difference between this array and that of the preferred embodiment shown in FIG. 1A is that this 11-segment array does not also display the addition symbol and, therefore, is composed of two fewer segments. In fact, FIG. 1A without segments 19 and 20 would show a schematic top view of such an 11-segment array.

Still another alternative embodiment (not shown) uses an 11-segment array that displays, one symbol at a time, essentially true representations of a multiplication symbol, a division symbol, and a composite symbol consisting of all eleven segments. This array is like that of the just discussed embodiment for multiplication, subtraction, and division, but it does not display its equivalents of segments 10, 11, and 12 alone as a group as a subtraction symbol. A similar alternative embodiment (not shown) use a similar 11-segment display to display multiplication, subtraction, and composite symbols, but not a division symbol.

A group of variations (not shown) of all discussed embodiments that can display a composite symbol is just like those embodiments, except that none of the variations in this group can display all segments of its arithmetic-symbol array simultaneously as a composite symbol.

In other alternative embodiments of a 13-segment array (not shown), all thirteen segments are not individually actuatable. In one such embodiment, for instance, segment 10 is individually actuatable, but each of the following five combinations of segments is actuatable only as a unit: (a) segments 11 and 12; (b) segments 13, 14, 15, and 16; (c) segments 17 and 18; (d) segments 19 and 20; and (e) segments 21 and 22. Thus, for instance, segment 21 cannot be actuated without segment 22 simultaneously being actuated.

Similarly, in other alternative embodiments of a seven-segment array (not shown), a nine-segment array (not shown) or of a 11-segment array (not shown), all segments are not individually actuatable. In one such embodiment of a nine-segment display, for instance, segment 60 is individually actuatable, but each of the following two combinations of segments is actuatable only as a unit: (a) segments 61, 62; 63, and 64, and (b) segments 65, 66, 67, and 68.

In other alternative embodiments (not shown), the display segments are shaped somewhat differently than in any of the embodiments previously described, and one or more of the operation symbols displayed are consequently shaped somewhat differently. For instance, in one such embodiment (not shown) the four ends of the multiplication symbol are rounded, not squared off. In another (not shown), the four ends of the addition symbol are rounded, and the division symbol's upper and lower components are either circular or oval, rather than rectangular. In still other embodiments (not shown), the four arms of the multiplication symbol and/or the addition symbol do not converge in V-shaped angles. For instance, in some of these other embodiments, the arms of the multiplication symbol converge in rounded, concave corners, and the display array's segments are shaped accordingly (e.g., a central segment with rounded indentations at its left and right ends, not V-shaped ones like those of segment 10 in FIG. 1A). Although unconventional and not optimal, even diagonal or convex junctures between the arms of the multiplication and/or addition symbol are workable. Of course, certain segments would need to be reconfigured accordingly. For instance, in FIG. 4 segment 60 could be reshaped as a regular octagon or even as a circle and the boundaries of the surrounding eight segments adjusted accordingly.

In still other embodiments (not shown), the arms of the multiplication symbol are perpendicular but they are less thick or thicker than those of the addition symbol. If they are less thick than the thickness of the arms of addition symbol multiplied by the square root of one-half (i.e., slightly more than 0.7), the minimum number of segments needed to display all four arithmetic symbols increases from thirteen to seventeen. In such a case, for instance; instead of each of segments 17 and 18 in FIG. 1A, there are three triangular segments (not shown), and segments 19 and 20 have an additional horizontal and central side instead of the point of their tip. If, on the other hand, the thickness of the arms of the multiplication symbol equals that of the arms of the addition symbol multiplied by the square root of one-half, the segment that corresponds to segment 17 in FIG. 1A, for instance, no longer is pentagonal, but rather becomes two right triangles facing each other and joined at the same corner (not shown).

In all embodiments, the central segment or central segment group (i.e., the central segment set) of the display array displays a central portion of the multiplication symbol and of the other displayable arithmetic operation symbol or symbols. At a minimum, this central portion of the symbols includes essentially the entire intersection of (a) the multiplication symbol and (b) a horizontal bar constituting the entire subtraction symbol, the horizontal portion of the addition symbol, and/or the vertically-centered portion of the division symbol (depending on which of these symbols can also be displayed). And the maximum horizontal dimension of the central segment set significantly exceeds (a) the maximum vertical dimension of the just-referenced horizontal bar and (b), if the addition symbol is displayable by the display array, the maximum horizontal dimension of segments used solely to display vertical portions of the addition symbol. In the preferred embodiment and others, the maximum horizontal dimension of the central segment set exceeds the other just-referenced dimensions by at least 70—approximately 140% in the case of the preferred embodiment. In still other inferior, yet still workable, embodiments, the former exceeds the latter by less. But in all embodiments, the former exceeds the latter by at least 20% since otherwise the arms of the multiplication symbol would appear excessively vertical in orientation, substantially misshapen, and/or excessively thin from the standpoint of legibility and clarity, especially when compared to the other symbol or symbols displayable by the display array.

Other alternative embodiments (not shown) use different LCD technology well known to persons skilled in the art. For instance, in some of them conventional "multiplexing" LCD technology is used instead of direct drive LCD technology. In multiplexing technology, appropriate segments are connected together to form groupings which are sequentially actuated by means of multiple backplane electrodes.

As a final example of other embodiments, some (not shown) use differently sized and/or shaped displays, light segments on a dark background instead of the opposite, smaller or larger gaps between segments, and/or technology other than LCD technology, such as vacuum-fluorescent technology, light-emitting-diode technology, gas-discharge-tube technology, electrochromic technology, etc.

Thus, the scope of the invention should be determined by the appended claims and their legal equivalents, rather than by the examples given.

We claim:

1. A display array for visually representing a plurality of different symbols, one symbol at a time, comprising at least five electronically operable segments, each of said segments being visually continuous, said segments including:
   (a) a first and central segment which is
     (1) divisible into
       (A) congruent left and right halves by an imaginary vertical axis, and
       (B) congruent upper and lower halves by an imaginary horizontal axis, and
     (2) bounded by
       (A) equally-long upper and lower boundaries which
         (i) are parallel to and equally spaced above and below said horizontal axis, respectively, such that the length of said upper boundary exceeds the distance between said boundaries by at least 20%, and
         (ii) each have left and right end points which are positioned on opposite sides of and nearly the same distance from said vertical axis with said left and right end points of said upper boundary being the same distance from said vertical axis as said right and left end points of said lower boundary, respectively, and (B) congruent left and right boundaries which connect said left end points and said right end points, respectively, (b) second and third segments which are essentially congruent and extend horizontally to the left and right of said central segment, respectively, (1) said second segment having a right boundary which is adjacent, is essentially congruent with, and essentially parallels said left boundary of said central segment, and (2) said third segment having a left boundary which is adjacent, is essentially congruent with, and essentially parallels said right boundary of said central segment, whereby, using said central segment and at least two more of said segments, but not said second segment nor said third segment, said array can display a substantially filled-out representation of a multiplication symbol resembling a cross, and whereby, using at least said central, second, and third segments, said array can display, one symbol at a time, a substantially filled-out representation of at least one symbol selected from the group consisting of an addition symbol, a subtraction symbol, and a division symbol.

2. The display array of claim 1 wherein said segments are liquid-crystal-display segments.

3. The display array of claim 1 wherein said segments also include:

(a) a fourth segment which (1) is configured approximately like a nearly upright, bold-faced v having a bottom which has been horizontally truncated so that said bottom is flat and wide, and (2) has a lower boundary which (A) is consequently straight and horizontal, (B) is above, adjacent, approximately equal in length to, and approximately centered with respect to said upper boundary of said central segment, and (C) has left and right end points, (b) a fifth segment which is essentially congruent with said fourth segment and has an upper boundary which (1) corresponds to said lower boundary of said fourth segment, (2) has left and right end points which correspond to said right and left end points of said lower boundary, respectively, and (3) is positioned below, adjacent, and approximately centered with respect to said lower boundary of said central segment, and (c) sixth and seventh segments which are (1) essentially congruent and oriented with respect to an imaginary nearly-vertical line halving said central segment, and (2) spaced essentially the same distance above and below said central segment, respectively, and apart from said fourth and fifth segments, whereby, using said central, fourth, and fifth segments, said array can display said representation of a multiplication symbol, and whereby, using said central, second, third, sixth, and seventh segments, said array can display a substantially filled-out representation of a division symbol.

4. The display array of claim 3 wherein said segments are liquid-crystal-display segments.

5. The display array of claim 1 wherein said segments also include:

(a) fourth and fifth segments which are essentially congruent, almost touching said central segment, and diagonally oriented and positioned at the lower left and upper right of said central segment, respectively, (b) sixth and seventh segments which are essentially congruent, almost touching said central segment, and diagonally oriented and positioned at the upper left and lower right of said central segment, respectively, (c) eighth and ninth segments which are (1) essentially congruent and positioned above and below said central segment, respectively, and (2) each bounded by (A) an inward boundary which is straight and horizontal and adjacent and nearly centered with respect to said central segment, (B) an outward boundary, and (C) left and right boundaries connecting said inward and outward boundaries and adjacent said sixth and fifth segments, respectively, in the case of said eighth segment, and adjacent said fourth and seventh segments, respectively, in the case of said ninth segment, (d) tenth and eleventh segments which (1) are essentially congruent, (2) are nearly-vertically oriented above and below said eighth and ninth segments, respectively, and (3) are each bounded by (A) an inward boundary which is adjacent, is essentially congruent with, and essentially parallels said outward boundary of said eighth segment and said outward boundary of said ninth segment, respectively, (B) an outward boundary, and (C) parallel and nearly vertical left and right boundaries which (i) connect said inward and outward boundaries, and (ii) are positioned so that the horizontally-measured distance between said left and right boundaries is exceeded by the length of said upper boundary of said central segment by at least 20%, whereby, using said central, fourth, fifth, sixth, seventh, eighth, and ninth segments, said array can display said representation of a multiplication symbol, and whereby, using at least said central, second, third, eighth, ninth, tenth, and eleventh segments, said array can display a substantially filled-out representation of an addition symbol.

6. The display array of claim 5 wherein said segments are liquid-crystal-display segments.

7. The display array of claim 5, further including a case for holding said array and circuitry for activating said array, thereby to provide a device for facilitating learning of mathematical skills.

8. The display array of claim 7 wherein said segments are liquid-crystal-display segments.

9. The display array of claim 5 wherein said segments are liquid-crystal-display segments and also include essentially congruent twelfth and thirteenth segments which, respectively, are adjacent and nearly vertically oriented above and below said tenth and eleventh segments, whereby, using said central, second, third, eighth, ninth, tenth, eleventh, twelfth, and thirteenth segments, said array can display said representation of an addition symbol, and whereby, using said central, second, third, twelfth, and thirteenth segments, said array can display a substantially filled-out representation of a division symbol.

10. The display array of claim 9, further including a case for holding said array and circuitry for activating said array, thereby to provide a mathematical calculator.

11. The display array of claim 9, further including a case for holding said array and circuitry for activating said array, thereby to provide a device for facilitating learning of mathematical skills wherein the length of said upper boundary of said central segment exceeds by at least 70% each of (a) the distance between said upper and lower boundaries of said central segment and (b) said horizontally-measured distance between said left and right boundaries of said tenth segment.

12. A display array for visually representing a plurality of different symbols, one symbol at a time, comprising nine electronically operable segments, each of said segments being visually continuous, said segments including:
   (a) a first and central segment which
      (1) is divisible into
         (A) congruent left and right halves by an imaginary vertical axis, and
         (B) congruent upper and lower halves by an imaginary horizontal axis,
      (2) is bounded sequentially by
         (A) left, upper-left, upper, and upper-right boundaries, and
         (B) right, lower-right, lower, and lower-left boundaries which are opposite and congruent with said left, upper-left, upper, and upper-right boundaries, respectively, and
      (3) has a maximum horizontal dimension,
   (b) second and third segments which are essentially congruent and extend horizontally to the left and right of said central segment, respectively,
      (1) said second segment having a right boundary which is adjacent, is essentially congruent with, and essentially parallels said left boundary of said central segment, and,
      (2) said third segment having a left boundary which is adjacent, is essentially congruent with, and essentially parallels said right boundary of said central segment,
   (c) fourth and fifth segments which are essentially congruent and extend diagonally to the lower left and upper right of said central segment, respectively,
      (1) said fourth segment having an upper-right boundary which is adjacent, is essentially congruent with, and essentially parallels said lower-left boundary of said central segment, and
      (2) said fifth segment having a lower-left boundary which is adjacent, is essentially congruent with, and essentially parallels said upper-right boundary of said central segment,
   (d) sixth and seventh segments which are essentially congruent and extend diagonally to the upper left and lower right of said central segment, respectively,
      (1) said sixth segment having a lower-right boundary which is adjacent, is essentially congruent with, and essentially parallels said upper-left boundary of said central segment, and
      (2) said seventh segment having an upper-left boundary which is adjacent, is essentially congruent with, and essentially parallels said lower-right boundary of said central segment,
   (e) eighth and ninth segments which are essentially congruent and extend nearly vertically above and below said central segment, respectively,
      (1) said eighth segment having a lower boundary which is adjacent, is essentially congruent with, and essentially parallels said upper boundary of said central segment,
      (2) said ninth segment having an upper boundary which is adjacent, is essentially congruent with, and essentially parallels said lower boundary of said central segment, and
      (3) both said eighth and ninth segments having parallel and nearly vertical left and right boundaries separated by a horizontally-measured distance which is exceeded by said maximum horizontal dimension of said central segment by at least 20%,
whereby, using said central, fourth, fifth, sixth, and seventh segments, said array can display a substantially filled-out representation of a multiplication symbol resembling a cross, and
whereby, using said central, second, third, eighth, and ninth segments, said array can display a substantially filled-out representation of an addition symbol.

13. The display array of claim 12 wherein said segments are liquid-crystal-display segments.

14. The display array of claim 13, further including a case for holding said array and circuitry for activating said array, thereby to provide a device for facilitating learning of mathematical skills.

15. A display array for visually representing a plurality of different symbols, one symbol at a time, comprising at least five electronically operable segments, each of said segments being itself visually continuous, said segments including:
   (a) a first and central segment which is
      (1) symmetrical about imaginary vertical and horizontal axes,
      (2) bounded by
         (A) parallel upper and lower boundaries which
            (i) are spaced above and below said horizontal axis, respectively, and are symmetrical with each other with respect to said horizontal axis, such that the length of said upper boundary exceeds the distance between said boundaries by at least 20%,
            (ii) are symmetrical about said vertical axis, and
            (iii) each have left and right end points,
         (B) a left boundary which
            (i) is symmetrical about said horizontal axis,
            (ii) begins at said left end point of said upper boundary,
            (iii) then extends rightward and downward to a point located on said horizontal axis and to the left of said vertical axis, and
            (iv) then extends leftward and downward to said left end point of said lower boundary,
            (v) such that said central segment has a horizontally-oriented, narrowing left-side indentation, and
         (C) a right boundary which
            (i) connects said right end points of said upper and lower boundaries, and
            (ii) is symmetrical with said left boundary relative to said vertical axis,
   (b) second and third segments which extend horizontally to the left and right of said central segment, respectively, and are symmetrical about said horizontal axis and with each other relative to said vertical axis,
      (1) said second segment having a right boundary which is adjacent, is essentially congruent with, and essentially parallels said left boundary of said central segment, and (2) said third segment having a left boundary which is adjacent, is essentially congruent with, and essentially parallels said right boundary of said central segment, whereby, using said central segment and at least two more of said segments, but not said second segment nor said third segment, said array can display a substantially filled-out representation of a multiplication symbol resembling a cross, and whereby, using at least said central, second, and third segments, said array can display, one symbol at a time, a substantially filled-out representation of at least one symbol selected from the group consisting of an addition symbol, a subtraction symbol, and a division symbol.

16. The display array of claim 15 wherein said segments are liquid-crystal-display segments.

17. The display array of claim 15 wherein said segments also include:
    (a) a fourth segment which
        (1) is symmetrical about said vertical axis,
        (2) is configured approximately like an upright bold-faced v having a bottom which has been horizontally truncated so that said bottom is flat and wide, and
        (3) has a lower boundary which
            (A) is consequently straight and horizontal, and
            (B) is above, adjacent, and approximately equal in length to said upper boundary of said central segment,
    (b) a fifth segment symmetrical with said fourth segment relative to said horizontal axis, and
    (c) sixth and seventh segments which are
        (1) symmetrical with each other relative to said horizontal axis, and
        (2) spaced and approximately centered above and below said central segment, respectively, and apart from said fourth and fifth segments, whereby, using said central, fourth, and fifth segments, said array can display said representation of a multiplication symbol, and whereby, using said central, second, third, sixth, and seventh segments, said array can display a substantially filled-out representation of a division symbol.

18. The display array of claim 17 wherein said segments are liquid-crystal-display segments.

19. The display array of claim 15 wherein said segments also include:
    (a) a fourth segment which is positioned to the upper left of said central segment and which has
        (1) a lower oblique boundary which is straight and has a lower-right end point positioned adjacent said left end point of said upper boundary of said central segment,
        (2) an upper oblique boundary which is straight and parallel to, and generally opposite and to the upper right of, said lower oblique boundary, and
        (3) a narrowing lower-right tip positioned above and almost touching said upper boundary of said central segment,
    (b) fifth and sixth segments symmetrical with said fourth segment relative to said horizontal and vertical axes, respectively,
    (c) a seventh segment which is symmetrical with said fifth segment relative to said vertical axis and which has lower and upper oblique boundaries aligned with said lower and upper oblique boundaries of said fourth segment, respectively,
    (d) an eighth segment above said central segment, symmetrical about said vertical axis, and bounded by
        (1) an inward boundary which is straight, horizontal, symmetrical relative to said vertical axis, and adjacent said upper boundary of said central segment, and which has a left end point,
        (2) an outward boundary which
            (A) is above and opposite said inward boundary and symmetrical relative to said vertical axis, and
            (B) which extends from a left end point downward and rightward to a point on said vertical axis significantly above said horizontal axis, and then extends upward and rightward to a right end point,
            (C) such that said eighth segment has a narrowing vertically-oriented indentation formed by said outward boundary,
        (3) a left boundary which begins at said left end point of said inward boundary, ascends along and adjacent said lower-right tip of said fourth segment, and terminates at said left end point of said outward boundary, and
        (4) a right boundary symmetrical with said left boundary relative to said vertical axis,
    (e) a ninth segment symmetrical with said eighth segment relative to said horizontal axis,
    (f) tenth and eleventh segments which
        (1) are symmetrical around said vertical axis and with each other relative to said horizontal axis,
        (2) are above and below said eighth and ninth segments, respectively,
        (3) each have vertical and parallel left and right boundaries positioned so that the distance between said left and right boundaries is exceeded by the length of said upper boundary of said central segment by at least 20%, and
        (4) have an inward boundary which is adjacent, is essentially congruent with, and essentially parallels said outward boundary of said eighth segment and said outward boundary of said ninth segment, respectively, whereby, using said central, fourth, fifth, sixth, seventh, eighth, and ninth segments, said array can display said representation of a multiplication symbol, and whereby, using at least said central, second, third, eighth, ninth, tenth, and eleventh segments, said array can display a substantially filled-out representation of an addition symbol.

20. The display array of claim 19 wherein said segments are liquid-crystal-display segments.

21. The display array of claim 19, further including a case for holding said array and circuitry for activating said array, thereby to provide a device for facilitating learning of mathematical skills.

22. The display array of claim 21 wherein said segments are liquid-crystal-display segments.

23. The display array of claim 22 wherein
    (a) said left boundary of said central segment and said right boundary of said second segment each are V-shaped,
    (b) said lower oblique boundary of said fourth segment is aligned with the top half of said left boundary of said central segment,
    (c) left boundary of said eighth segment is straight and aligned with said vertical left boundary of said tenth segment,
    (d) wherein said lower-right tip of said fourth segment has
        (1) a straight horizontal lower boundary adjacent and parallel a leftmost portion of said upper boundary of said central segment, and (2) a straight vertical right boundary adjacent and parallel said left boundary of said eighth segment, (e) wherein said outward boundary of said eighth segment is V-shaped, (f) wherein said inward boundary of said tenth segment is V-shaped, (g) wherein the length of said upper boundary of said central segment exceeds by at least 70% each of
  (1) the distance between said upper and lower boundaries of said central segment and
  (2) the distance between said left and right boundaries of said tenth segment, and (h) whereby said representation of a multiplication symbol is substantially normal.

24. The display array of claim 19 wherein said segments are liquid-crystal-display segments and also include twelfth and thirteenth segments which
  (a) are symmetrical around said vertical axis and with each other relative to said horizontal axis,
  (b) are above and below said tenth and eleventh segments, respectively, and adjacent said segments, respectively, whereby, using said central, second, third, eighth, ninth, tenth, eleventh, twelfth, and thirteenth segments, said array can display said representation of an addition symbol, and whereby, using said central, second, third, twelfth, and thirteenth segments, said array can display a substantially filled-out representation of a division symbol.

25. The display array of claim 24, further including a case for holding said array and circuitry for activating said array, thereby to provide a mathematical calculator.

26. The display array of claim 24, further including a case for holding said array and circuitry for activating said array, thereby to provide a device for facilitating learning of mathematical skills wherein the length of said upper boundary of said central segment exceeds by at least 70% each of
  (a) the distance between said upper and lower boundaries of said central segment and
  (b) the distance between said left and right boundaries of said tenth segment.

27. A display array for visually representing a plurality of different symbols, one symbol at a time, comprising nine electronically operable segments, each of said segments being visually continuous, said segments including:
  (a) a first and central segment which
    (1) is symmetrical about imaginary vertical and horizontal axes,
    (2) has a maximum horizontal dimension,
    (3) is bounded sequentially by left, upper-left, upper, upper-right, right, lower-right, lower, and lower-left boundaries,
      (A) said left and right boundaries being symmetrical around said horizontal axis and with each other relative to said vertical axis,
      (B) said upper and lower boundaries being symmetrical around said vertical axis and with each other relative to said horizontal axis,
      (C) said upper-left and lower-left boundaries being symmetrical with each other relative to said horizontal axis,
      (D) said upper-right and lower-right boundaries being symmetrical with each other relative to said horizontal axis and with said upper-left and lower-left boundaries, respectively, relative to said vertical axis,
      (E) each of said eight boundaries forming an indentation directed into said central segment,
      (F) such that said central segment has eight outwardly-pointing points,
  (b) a second segment which
    (1) extends horizontally to the left of said central segment,
    (2) is symmetrical around said horizontal axis, and
    (3) has a right boundary which forms a narrowing, rightward-directed tip and which is adjacent, is essentially congruent with, and essentially parallels said left boundary of said central segment,
  (c) a third segment symmetrical with said second segment relative to said vertical axis,
  (d) a fourth segment positioned to the upper left of said central segment, having
    (1) a straight lower oblique boundary having a lower-right end point adjacent where said left and upper-left boundaries of said central segment join,
    (2) a straight upper oblique boundary parallel to and generally opposite and to the upper right of said lower oblique boundary, and
    (3) a lower-right boundary which forms a narrowing, downward-and-rightward-directed tip and which is adjacent, is essentially congruent with, and essentially parallels said upper-left boundary of said central segment,
  (b) fifth and sixth segments symmetrical with said fourth segment relative to said horizontal and vertical axes, respectively,
  (c) a seventh segment which is symmetrical with said fifth segment relative to said vertical axis and which has lower and upper oblique boundaries aligned with said lower and upper oblique boundaries of said fourth segment, respectively,
  (d) an eighth segment which
    (1) is above said central segment and symmetrical around said vertical axis,
    (2) has vertical and parallel left and right boundaries separated by a distance that is exceeded by said maximum horizontal dimension of said central segment by at least 20%, and
    (3) has an inward boundary which forms a narrowing, downward-directed tip and which is adjacent, is essentially congruent with, and essentially parallels said upper boundary of said central segment,
  (e) a ninth segment which is symmetrical with said eighth segment relative to said horizontal axis whereby, using said central, fourth, fifth, sixth, and seventh segments, said array can display a substantially filled-out representation of a multiplication symbol resembling a cross, and whereby, using said central, second, third, eighth, and ninth segments, said array can display a substantially filled-out representation of an addition symbol.

28. The display array of claim 27 wherein said segments are liquid-crystal-display segments.

29. The display array of claim 28, further including a case for holding said array and circuitry for activating said array, thereby to provide a device for facilitating learning of mathematical skills.

30. A display array for visually representing a plurality of different symbols, one symbol at a time, comprising at least five segment groups, each of said segment groups comprising at least one, but not more than five, visually-continuous, electronically operable segments, the plural segments of each segment group being adjacent, said segment groups including:

(a) a first and central segment group which is
  (1) divisible into
    (A) left and right halves by an imaginary vertical axis such that said halves have congruent external shapes, and
    (B) upper and lower halves by an imaginary horizontal axis such that said halves have congruent external shapes, and
  (2) bounded by
    (A) equally-long upper and lower boundaries which
      (i) are parallel to and equally spaced above and below said horizontal axis, respectively, such that the length of said upper boundary exceeds the distance between said boundaries by at least 20%, and
      (ii) each have left and right end points which are positioned on opposite sides of and nearly the same distance from said vertical axis with said left and right end points of said upper boundary being the same distance from said vertical axis as said right and left end points of said lower boundary, respectively, and
    (B) congruent left and right boundaries which connect said left end points and said right end points, respectively,
(b) second and third segment groups which have essentially congruent external shapes and extend horizontally to the left and right of said central segment group, respectively,
  (1) said second segment group having a right boundary which is adjacent, is essentially congruent with, and essentially parallels said left boundary of said central segment group, and
  (2) said third segment group having a left boundary which is adjacent, is essentially congruent with, and essentially parallels said right boundary of said central segment,
whereby, using all segments included in said central segment group and in at least two more of said segment groups of said array, but not using any segment in either said second or said third segment group, said array can display a substantially filled-out representation of a multiplication symbol resembling a cross, and
whereby, using all segments included in at least said central, second, and third segment groups, said array can display, one symbol at a time, a substantially filled-out representation of at least one symbol selected from the group consisting of an addition symbol, a subtraction symbol, and a division symbol.

31. The display array of claim 30 wherein said segments are liquid-crystal-display segments.

32. The display array of claim 30 wherein said segment groups also include:
  (a) a fourth segment group which has
    (1) an external shape configured approximately like a nearly upright, bold-faced v having a bottom which has been horizontally truncated so that said bottom is flat and wide, and
    (2) a lower boundary which
      (A) is consequently straight and horizontal,
      (B) is above, adjacent, approximately equal in length to, and approximately centered with respect to said upper boundary of said central segment group, and
      (C) has left and right end points,
  (b) a fifth segment group which has
    (1) an external shape essentially congruent with said external shape of said fourth segment group, and
    (2) an upper boundary which
      (A) corresponds to said lower boundary of said fourth segment group,
      (B) has left and right end points which correspond to said right and left end points of said lower boundary, respectively, and
      (C) is positioned below, adjacent, and approximately centered with respect to said lower boundary of said central segment group, and
  (c) sixth and seventh segment groups which
    (1) have essentially congruent external shapes
    (2) are oriented with respect to an imaginary nearly-vertical line halving said central segment group, and
    (3) are spaced essentially the same distance above and below said central segment group, respectively, and apart from said fourth and fifth segment groups,
whereby, using all segments included in said central, fourth, and fifth segment groups, said array can display said representation of a multiplication symbol, and
whereby, using all segments included in said central, second, third, sixth, and seventh segment groups, said array can display a substantially filled-out representation of a division symbol.

33. The display array of claim 32 wherein said segments are liquid-crystal-display segments.

34. The display array of claim 30 wherein said segment groups also include:
  (a) fourth and fifth segment groups which have essentially congruent external shapes, are almost touching said central segment group, and are diagonally oriented and positioned at the lower left and upper right of said central segment group, respectively,
  (b) sixth and seventh segment groups which have essentially congruent external shapes, are almost touching said central segment group, and are diagonally oriented and positioned at the upper left and lower right of said central segment group, respectively,
  (c) eighth and ninth segment groups which
    (1) have essentially congruent external shapes,
    (2) are above and below said central segment group, respectively, and
    (3) are each bounded by
      (A) an inward boundary which is straight and horizontal and adjacent and nearly centered with respect to said central segment group,
      (B) an outward boundary,
      (C) left and right boundaries connecting said inward and outward boundaries and adjacent said sixth and fifth segment groups, respectively, in the case of said eighth segment group, and adjacent said fourth and seventh segment groups, respectively, in the case of said ninth segment group,
  (d) tenth and eleventh segment groups which
    (1) have essentially congruent external shapes,
    (2) are nearly-vertically oriented above and below said eighth and ninth segment groups, respectively, and
    (3) each bounded by
      (A) an inward boundary which is adjacent, is essentially congruent with, and essentially parallels said outward boundary of said eighth segment group and said outward boundary of said ninth segment group, respectively,
      (B) an outward boundary, and
      (C) parallel and nearly vertical left and right boundaries which
        (i) connect said inward and outward boundaries, and (ii) are positioned so that the horizontally-measured distance between said left and right boundaries is exceeded by the length of said upper boundary of said central segment group by at least 20%, whereby, using all segments included in said central, fourth, fifth, sixth, seventh, eighth, and ninth segment groups, said array can display said representation of a multiplication symbol, and whereby, using all segments included in at least said central, second, third, eighth, ninth, tenth, and eleventh segment groups, said array can display a substantially filled-out representation of an addition symbol.

35. The display array of claim 34 wherein said segments are liquid-crystal-display segments.

36. The display array of claim 34, further including a case for holding said array and circuitry for activating said array, thereby to provide a device for facilitating learning of mathematical skills.

37. The display array of claim 36 wherein said segments are liquid-crystal-display segments.

38. The display array of claim 34 wherein said segments are liquid-crystal-display segments and said segment groups also include nearly-vertically oriented twelfth and thirteenth segment groups having essentially congruent external shapes, (a) said twelfth segment group being adjacent and nearly centered above said tenth segment group, and (b) said thirteenth segment group being adjacent and nearly centered below said eleventh segment group, whereby, using all segments included in said central, second, third, eighth, ninth, tenth, eleventh, twelfth, and thirteenth segment groups, said array can display said representation of an addition symbol, and whereby, using all segments included in said central, second, third, twelfth, and thirteenth segment groups, said array can display a substantially filled-out representation of a division symbol.

39. The display array of claim 38, further including a case for holding said array and circuitry for activating said array, thereby to provide a mathematical calculator.

40. The display array of claim 38, further including a case for holding said array and circuitry for activating said array, thereby to provide a device for facilitating learning of mathematical skills wherein the length of said upper boundary of said central segment group exceeds by at least 70% each of (a) the distance between said upper and lower boundaries of said central segment group and (b) said horizontally-measured distance between said left and right boundaries of said tenth segment group.

41. A display array for visually representing a plurality of different symbols, one symbol at a time, comprising nine segment groups, each of said segment groups comprising at least one, but not more than five, visually-continuous, electronically operable segments, the plural segments of each segment group being adjacent, said segment groups including:

(a) a first and central segment group which
    (1) is divisible into
        (A) left and right halves by an imaginary vertical axis such that said halves have congruent external shapes, and
        (B) upper and lower halves by an imaginary horizontal axis such that said halves have congruent external shapes, and
    (2) is bounded sequentially by
        (A) left, upper-left, upper, and upper-right boundaries, and
        (B) right, lower-right, lower, and lower-left boundaries which are opposite and congruent with said left, upper-left, upper, and upper-right boundaries, respectively, and
    (3) has a maximum horizontal dimension, (b) second and third segment groups which have essentially congruent external shapes and extend horizontally to the left and right of said central segment group, respectively,
    (1) said second segment group having a right boundary which is adjacent, is essentially congruent with, and essentially parallels said left boundary of said central segment group, and,
    (2) said third segment group having a left boundary which is adjacent, is essentially congruent with, and essentially parallels said right boundary of said central segment group, (c) fourth and fifth segment groups which have essentially congruent external shapes and extend diagonally to the lower left and upper right of said central segment group, respectively,
    (1) said fourth segment group having an upper-right boundary which is adjacent, is essentially congruent with, and essentially parallels said lower-left boundary of said central segment group, and
    (2) said fifth segment group having a lower-left boundary which is adjacent, is essentially congruent with, and essentially parallels said upper-right boundary of said central segment group, (d) sixth and seventh segment groups which have essentially congruent external shapes and extend diagonally to the upper left and lower right of said central segment group, respectively,
    (1) said sixth segment group having a lower-right boundary which is adjacent, is essentially congruent with, and essentially parallels said upper-left boundary of said central segment group, and
    (2) said seventh segment group having an upper-left boundary which is adjacent, is essentially congruent with, and essentially parallels said lower-right boundary of said central segment group, (e) eighth and ninth segment groups which have essentially congruent external shapes and extend nearly vertically above and below said central segment group, respectively,
    (1) said eighth segment group having a lower boundary which is adjacent, is essentially congruent with, and essentially parallels said upper boundary of said central segment group,
    (2) said ninth segment group having an upper boundary which is adjacent, is essentially congruent with, and essentially parallels said lower boundary of said central segment group, and
    (3) both said eighth and ninth segment groups having parallel and nearly vertical left and right boundaries separated by a horizontally-measured distance which is exceeded by said maximum horizontal dimension of said upper boundary of said central segment group by at least 20%, whereby, using all segments included in said central, fourth, fifth, sixth, and seventh segment groups, said array can display a substantially filled-out representation of a multiplication symbol resembling a cross, and whereby, using all segments included in said central, second, third, eighth, and ninth segment groups, said array can display a substantially filled-out representation of an addition symbol.

42. The display array of claim 41 wherein said segments are liquid-crystal-display segments.

43. The display array of claim 42, further including a case for holding said array and circuitry for activating said array, thereby to provide a device for facilitating learning of mathematical skills.

44. A display array for visually representing a plurality of different symbols, one symbol at a time, comprising at least five segment groups, each of said segment groups comprising at least one, but not more than five, visually-continuous, electronically operable segments, the plural segments of each segment group being adjacent, said segment groups including:
- (a) a first and central segment group which:
  - (1) has an external shape symmetrical about imaginary vertical and horizontal axes,
  - (2) is bounded by
    - (A) parallel upper and lower boundaries which
      - (i) are symmetrical about said vertical axis and with each other with respect to said horizontal axis,
      - (ii) are spaced above and below said horizontal axis, respectively, such that the length of said upper boundary exceeds the distance between said boundaries by at least 20%, and
      - (iii) each have left end points,
    - (B) a left boundary which
      - (i) is symmetrical about said horizontal axis,
      - (ii) begins at said left end point of said upper boundary,
      - (iii) then extends rightward and downward to a point located on said horizontal axis and to the left of said vertical axis, and
      - (iv) then extends leftward and downward to said left end point of said lower boundary,
      - (v) such that said central segment group has a horizontally-oriented, narrowing left-side indentation, and
    - (C) a right boundary which is symmetrical with said left boundary relative to said vertical axis,
- (b) second and third segment groups which extend horizontally to the left and right of said central segment group, respectively, and have externals shapes which are symmetrical about said horizontal axis and with each other relative to said vertical axis,
  - (1) said second segment group having a right boundary which is adjacent, is essentially congruent with, and essentially parallels said left boundary of said central segment group, and
  - (2) said third segment group having a left boundary which is adjacent, is essentially congruent with, and essentially parallels said right boundary of said central segment group, whereby, using all segments included in said central segment group and in at least two more of said segment groups of said array, but not using any segment in either said second or said third segment group, said array can display a substantially filled-out representation of a multiplication symbol resembling a cross, and whereby, using all segments included in at least said central, second, and third segment groups, said array can display, one symbol at a time, a substantially filled-out representation of at least one symbol selected from the group consisting of an addition symbol, a subtraction symbol, and a division symbol.

45. The display array of claim 44 wherein said segments are liquid-crystal-display segments.

46. The display array of claim 44 wherein said segment groups also include:
- (a) a fourth segment group which
  - (1) has an external shape which is symmetrical about said vertical axis and is configured approximately like an upright bold-faced v having a bottom which has been horizontally truncated so that said bottom is flat and wide, and
  - (2) has a lower boundary which
    - (A) is consequently straight and horizontal, and
    - (B) is above, adjacent, and approximately equal in length to said upper boundary of said central segment group,
- (b) a fifth segment group having an external shape symmetrical with said external shape of said fourth segment group relative to said horizontal axis, and
- (c) sixth and seventh segment groups which
  - (1) have external shapes which are symmetrical with each other relative to said horizontal axis, and
  - (2) are spaced and approximately centered above and below said central segment group, respectively, and apart from said fourth and fifth segment groups, whereby, using all segments included in said central, fourth, and fifth segment groups, said array can display said representation of a multiplication symbol, and whereby, using all segments included in said central, second, third, sixth, and seventh segment groups, said array can display a substantially filled-out representation of a division symbol.

47. The display array of claim 46 wherein said segments are liquid-crystal-display segments.

48. The display array of claim 44 wherein said segment groups also include:
- (a) a fourth segment group which is positioned to the upper left of said central segment group and which has
  - (1) a lower oblique boundary which is straight and has a lower-right end point positioned adjacent said left end point of said upper boundary of said central segment group,
  - (2) an upper oblique boundary which is straight and parallel to, and generally opposite and to the upper right of, said lower oblique boundary,
  - (3) a narrowing lower-right tip positioned above and almost touching said upper boundary of said central segment group, and
  - (4) a diagonally-oriented external shape,
- (b) fifth and sixth segment groups which have external shapes which are symmetrical with said external shape of said fourth segment group relative to said horizontal and vertical axes, respectively,
- (c) a seventh segment group which has an external shape which is symmetrical with said external shape of said fifth segment group relative to said vertical axis and which has lower and upper oblique boundaries aligned with said lower and upper oblique boundaries of said fourth segment group, respectively,
- (d) an eighth segment group positioned above said central segment group, having an external shape symmetrical about said vertical axis, and bounded by
  - (1) an inward boundary which is straight, horizontal, symmetrical relative to said vertical axis, and adjacent said upper boundary of said central segment group, and which has a left end point,
  - (2) an outward boundary which
    - (A) is above and opposite said inward boundary and symmetrical relative to said vertical axis, and (B) which extends from a left end point downward and rightward to a point on said vertical axis significantly above said horizontal axis and then extends upward and rightward to a right end point, (C) such that said eighth segment group has a narrowing vertically-oriented indentation formed by said outward boundary, (3) a left boundary which begins at said left end point of said inward boundary, ascends along and adjacent said lower-right tip of said fourth segment group, and terminates at said left end point of said outward boundary, and (4) a right boundary symmetrical with said left boundary relative to said vertical axis, (e) a ninth segment group having an external shape symmetrical with said external shape of said eighth segment group relative to said horizontal axis, (f) tenth and eleventh segment groups which (1) have external shapes which are symmetrical around said vertical axis and with each other relative to said horizontal axis, (2) are above and below said eighth and ninth segment groups, respectively, (3) each have vertical and parallel left and right boundaries positioned so that the distance between said left and right boundaries is exceeded by the length of said upper boundary of said central segment group by at least 20%, and (4) have an inward boundary which is adjacent, is essentially congruent with, and essentially parallels said outward boundary of said eighth segment group and said outward boundary of said ninth segment group, respectively, whereby, using all segments included in said central, fourth, fifth, sixth, seventh, eighth, and ninth segment groups, said array can display said representation of a multiplication symbol, and whereby, using all segments included in at least said central, second, third, eighth, ninth, tenth, and eleventh segment groups, said array can display a substantially filled-out representation of an addition symbol.

49. The display array of claim 48 wherein said segments are liquid-crystal-display segments.

50. The display array of claim 48, further including a case for holding said array and circuitry for activating said array, thereby to provide a device for facilitating learning of mathematical skills.

51. The display array of claim 50 wherein said segments are liquid-crystal-display segments.

52. The display array of claim 51 wherein (a) said left boundary of said central segment group and said right boundary of said second segment group each are V-shaped, (b) said lower oblique boundary of said fourth segment group is aligned with the top half of said left boundary of said central segment group, (c) said left boundary of said eighth segment group is straight and aligned with said left boundary of said tenth segment group, (d) wherein said lower-right tip of said fourth segment group has (1) a straight horizontal lower boundary adjacent and parallel a leftmost portion of said upper boundary of said central segment group, and (2) a straight vertical right boundary adjacent and parallel said left boundary of said eighth segment group, (e) wherein said outward boundary of said eighth segment group is V-shaped, (f) wherein said inward boundary of said tenth segment group is V-shaped, (g) wherein the length of said upper boundary of said central segment group exceeds by at least 70% each of (1) the distance between said upper and lower boundaries of said central segment group and (2) the distance between said left and right boundaries of said tenth segment group, and (h) whereby said representation of a multiplication symbol is substantially normal.

53. The display array of claim 48 wherein said segments are liquid-crystal-display segments and said segment groups also include twelfth and thirteenth segment groups which (a) have external shapes which are symmetrical around said vertical axis and with each other relative to said horizontal axis, (b) are above and below said tenth and eleventh segment groups, respectively, and adjacent said segment groups, respectively, whereby, using all segments included in said central, second, third, eighth, ninth, tenth, eleventh, twelfth, and thirteenth segment groups, said array can display said representation of an addition symbol, and whereby, using all segments included in said central, second, third, twelfth, and thirteenth segment groups, said array can display a substantially filled-out representation of a division symbol.

54. The display array of claim 53, further including a case for holding said array and circuitry for activating said array, thereby to provide a mathematical calculator.

55. The display array of claim 53, further including a case for holding said array and circuitry for activating said array, thereby to provide a device for facilitating learning of mathematical skills wherein the length of said upper boundary of said central segment group exceeds by at least 70% each of (a) the distance between said upper and lower boundaries of said central segment group and (b) the distance between said left and right boundaries of said tenth segment group.

56. A display array for visually representing a plurality of different symbols, one symbol at a time, comprising nine segment groups, each of said segment groups comprising at least one, but not more than five, visually-continuous, electronically operable segments, the plural segments of each segment group being adjacent, said segment groups including:

(a) a first and central segment group which (1) has an external shape symmetrical about imaginary vertical and horizontal axes, (2) has a maximum horizontal dimension, (3) is bounded sequentially by left, upper-left, upper, upper-right, right, lower-right, lower, and lower-left boundaries, (A) said left and right boundaries being symmetrical around said horizontal axis and with each other relative to said vertical axis, (B) said upper and lower boundaries being symmetrical around said vertical axis and with each other relative to said horizontal axis, (C) said upper-left and lower-left boundaries being symmetrical with each other relative to said horizontal axis, (D) said upper-right and lower-right boundaries being symmetrical with each other relative to said horizontal axis and with said upper-left and lower-left boundaries, respectively, relative to said vertical axis,
- (E) each of said eight boundaries forming an indentation directed into said central segment group,
- (F) such that said central segment group has eight outwardly-pointing points,
(b) a second segment group which
  - (1) extends horizontally to the left of said central segment group,
  - (2) has an external shape symmetrical around said horizontal axis, and
  - (3) has a right boundary which forms a narrowing, rightward-directed tip and which is adjacent, is essentially congruent with, and essentially parallels said left boundary of said central segment group,
(c) a third segment group which has an external shape symmetrical with said external shape of said second segment group relative to said vertical axis,
(d) a fourth segment group positioned to the upper left of said central segment group, having
  - (1) a straight lower oblique boundary having a lower-right end point adjacent where said left and upper-left boundaries of said central segment group join,
  - (2) a straight upper oblique boundary parallel to and generally opposite and to the upper right of said lower oblique boundary,
  - (3) a lower-right boundary which forms a narrowing, downward-and-rightward-directed tip and which is adjacent, is essentially congruent with, and essentially parallels said upper-left boundary of said central segment group, and
  - (4) an external shape,
(b) fifth and sixth segment groups which have external shapes symmetrical with said external shape of said fourth segment group relative to said horizontal and vertical axes, respectively,
(c) a seventh segment group which has an external shape symmetrical with said external shape of said fifth segment group relative to said vertical axis and which has lower and upper oblique boundaries aligned with said lower and upper oblique boundaries of said fourth segment group, respectively,
(d) an eighth segment group which
  - (1) is above said central segment group
  - (2) has an external shape symmetrical around said vertical axis,
  - (3) has vertical and parallel left and right boundaries separated by a distance that is exceeded by said maximum horizontal dimension of said central segment group by at least 20%, and
  - (4) has an inner boundary which forms a narrowing, downward-directed tip and which is adjacent, is essentially congruent with, and essentially parallels said upper boundary of said central segment group,
(e) a ninth segment group which has an external shape symmetrical with said external shape of said eighth segment group relative to said horizontal axis whereby, using all segments included in said central, fourth, fifth, sixth, and seventh segment groups, said array can display a substantially filled-out representation of a multiplication symbol resembling a cross, and whereby, using all segments included in said central, second, third, eighth, and ninth segment groups, said array can display a substantially filled-out representation of an addition symbol.

57. The display array of claim 56 wherein said segments are liquid-crystal-display segments.

58. The display array of claim 57, further including a case for holding said array and circuitry for activating said array, thereby to provide a device for facilitating learning of mathematical skills.

* * * * *